United States Patent [19]

Campbell

[11] Patent Number: 6,008,758
[45] Date of Patent: Dec. 28, 1999

[54] METHOD AND APPARATUS FOR DOPPLER COMPENSATION IN A SATELLITE COMMUNICATIONS SYSTEM

[75] Inventor: Thomas B. Campbell, Cedar Rapids, Iowa

[73] Assignee: Rockwell International Corporation, Milwaukee, Wis.

[21] Appl. No.: 09/084,747

[22] Filed: May 26, 1998

[51] Int. Cl.$^6$ .................................................. H04B 7/185
[52] U.S. Cl. ......................................... 342/358; 455/12.1
[58] Field of Search .................................. 342/352, 358, 342/418; 455/12.1

[56] References Cited

U.S. PATENT DOCUMENTS

| | | | |
|---|---|---|---|
| 5,063,387 | 11/1991 | Mower | 342/103 |
| 5,566,354 | 10/1996 | Sehloemer | 455/12.1 |
| 5,613,193 | 3/1997 | Ishikawa et al. | 455/12.1 |
| 5,640,166 | 6/1997 | Siwiak | 342/354 |
| 5,666,122 | 9/1997 | Carter | 342/357 |
| 5,742,908 | 4/1998 | Dent | 455/517 |
| 5,874,913 | 2/1999 | Blanchard et al. | 342/352 |

OTHER PUBLICATIONS

*Inmarsat Aeronautical System Definition Manual*, Module 1, Version 1.46.03, pp. 18, 68B, 68C, and 68D, Oct. 1997.
*Inmarsat Aeronautical System Definition Manual*, Module 2, Version 1.20.01, p. 23, Sep. 1997.
*Arinc Characteristic 741P2–3 Aviation Satellite Communication System*, pp. 4, 10, Dec. 30, 1994.
*Minimum Operational Performance Standards for Aeronautical Mobile Satellite Services (AMSS)*, pp. 38, 39, Jan. 1996.
*Amendment to the International Standards and Recommended Practices and Procedures for Air Navigation Services*, p. 25, Mar. 1995.

*Primary Examiner*—Mark Hellner
*Attorney, Agent, or Firm*—Kyle Eppele; James P. O'Shaughnessy

[57] ABSTRACT

A method and apparatus for Doppler compensation in a satellite communications system such as Inmarsat's SAT-COM network are disclosed. An aircraft terminal provides satellite communications services in one of several user-selectable modes including a circuit-mode services only mode and other modes providing some data packet services. The terminal includes multiple channel units coupled to a processing circuit. The channel units communicate radio signals via data or circuit channels between the aircraft and a satellite. Each channel unit can receive a channel input transmitted at a known frequency, and measure its frequency. Each channel unit can also transmit a channel output at an adjustable frequency. Each channel unit is operated as a circuit channel when circuit-mode services only is selected. Doppler shift is measured using the difference between the measured and known transmitted frequencies of at least one channel input. The measured Doppler shift is used to determine a Doppler correction for each transmission, and the correction is applied to adjust the frequency of each transmitted channel output to maintain the transmissions within an error budget.

20 Claims, 17 Drawing Sheets

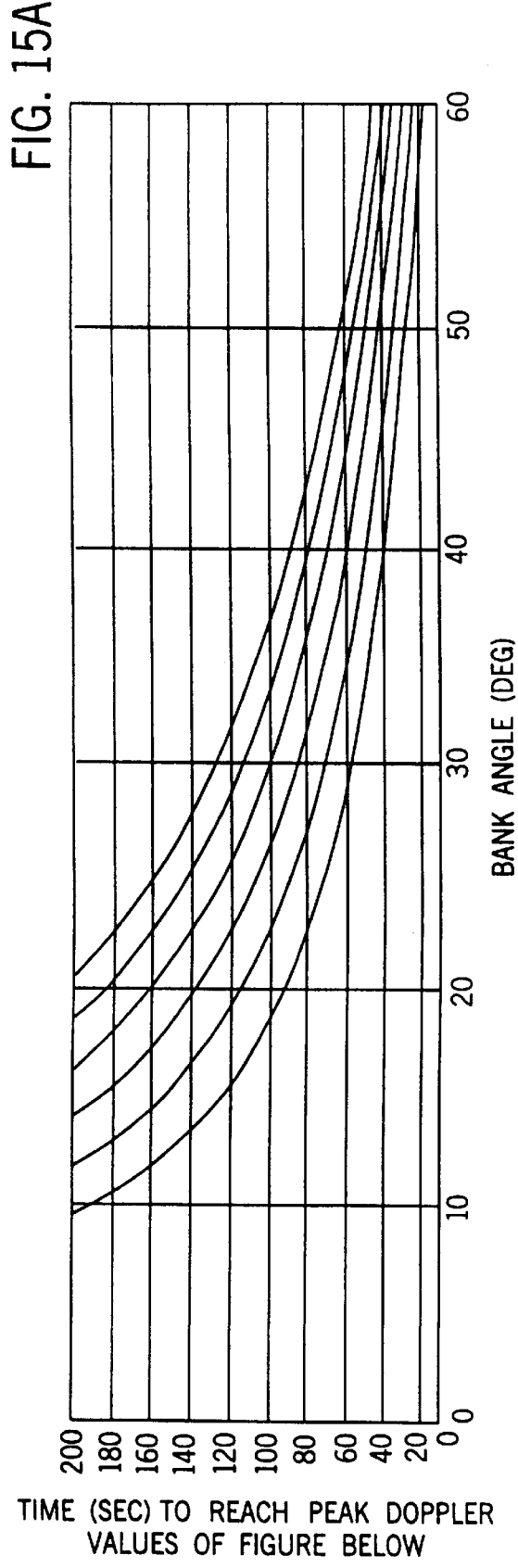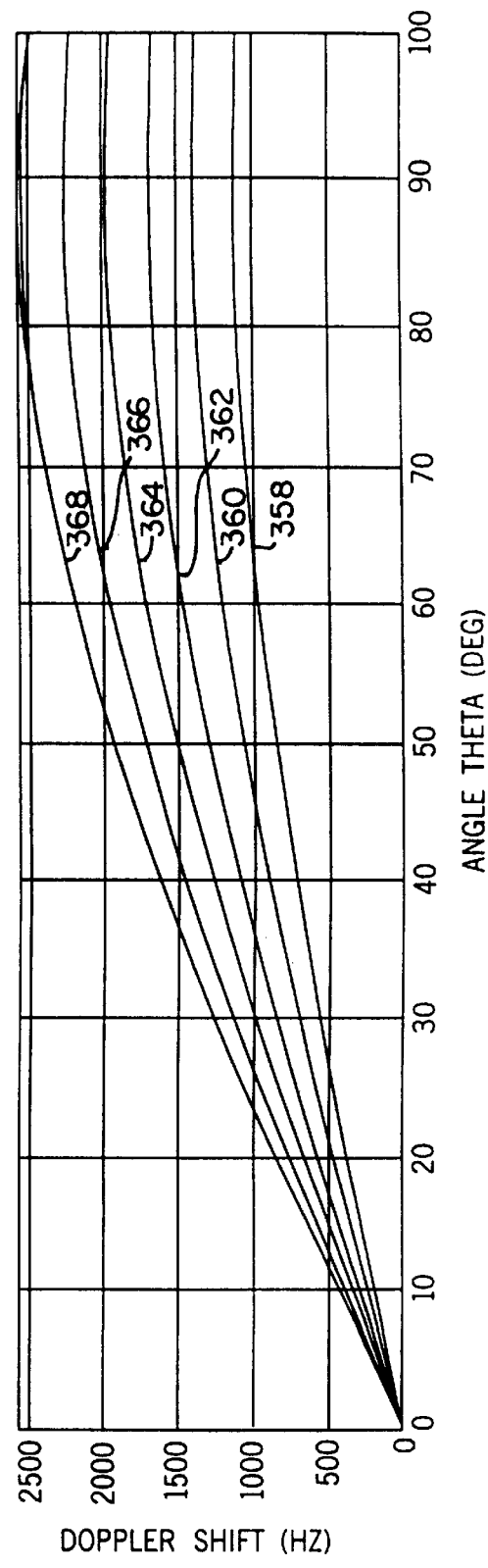

TABLE 1. TABULATED ELAPSED TIME TO REACH FREQUENCY ERROR BUDGET

| BANK ANGLE | LOAD FACTOR | TIME(185 HZ) | TIME(100 HZ) |
| --- | --- | --- | --- |
| 0 | 1.0000e+000 | 3.2914e+016 | 1.7791e+016 |
| 1.0000e+000 | 1.0002e+000 | 3.0668e+002 | 1.6577e+002 |
| 2.0000e+000 | 1.0006e+000 | 1.5329e+002 | 8.2861e+001 |
| 3.0000e+000 | 1.0014e+000 | 1.0214e+002 | 5.5213e+001 |
| 4.0000e+000 | 1.0024e+000 | 7.6553e+001 | 4.1380e+001 |
| 5.0000e+000 | 1.0038e+000 | 6.1186e+001 | 3.3074e+001 |
| 6.0000e+000 | 1.0055e+000 | 5.0931e+001 | 2.7531e+001 |
| 7.0000e+000 | 1.0075e+000 | 4.3598e+001 | 2.3566e+001 |
| 8.0000e+000 | 1.0098e+000 | 3.8089e+001 | 2.0589e+001 |
| 9.0000e+000 | 1.0125e+000 | 3.3798e+001 | 1.8269e+001 |
| 1.0000e+001 | 1.0154e+000 | 3.0359e+001 | 1.6410e+001 |
| 1.1000e+001 | 1.0187e+000 | 2.7539e+001 | 1.4886e+001 |
| 1.2000e+001 | 1.0223e+000 | 2.5184e+001 | 1.3613e+001 |
| 1.3000e+001 | 1.0263e+000 | 2.3187e+001 | 1.2533e+001 |
| 1.4000e+001 | 1.0306e+000 | 2.1470e+001 | 1.1605e+001 |
| 1.5000e+001 | 1 0353e+000 | 1.9978e+001 | 1.0799e+001 |
| 1.6000e+001 | 1.0403e+000 | 1.8669e+001 | 1.0091e+001 |
| 1.7000e+001 | 1.0457e+000 | 1.7509e+001 | 9.4645e+000 |
| 1.8000e+001 | 1.0515e+000 | 1.6475e+001 | 8.9055e+000 |
| 1.9000e+001 | 1.0576e+000 | 1.5547e+001 | 8.4035e+000 |
| 2.0000e+001 | 1.0642e+000 | 1.4708e+001 | 7.9500e+000 |
| 2.1000e+001 | 1.0711e+000 | 1.3945e+001 | 7.5380e+000 |
| 2.2000e+001 | 1.0785e+000 | 1.3249e+001 | 7.1618e+000 |
| 2.3000e+001 | 1.0864e+000 | 1.2611e+001 | 6.8168e+000 |
| 2.4000e+001 | 1.0946e+000 | 1.2023e+001 | 6.4991e+000 |
| 2.5000e+001 | 1.1034e+000 | 1.1480e+001 | 6.2053e+000 |
| 2.6000e+001 | 1.1126e+000 | 1.0976e+001 | 5.9327e+000 |
| 2.7000e+001 | 1.1223e+000 | 1.0506e+001 | 5.6790e+000 |
| 2.8000e+001 | 1.1326e+000 | 1.0068e+001 | 5.4420e+000 |
| 2.9000e+001 | 1.1434e+000 | 9.6573e+000 | 5.2201e+000 |
| 3.0000e+001 | 1.1547e+000 | 9.2719e+000 | 5.0118e+000 |
| 3.1000e+001 | 1.1666e+000 | 8.9091e+000 | 4.8157e+000 |
| 3.2000e+001 | 1.1792e+000 | 8.5668e+000 | 4.6307e+000 |
| 3.3000e+001 | 1.1924e+000 | 8.2431e+000 | 4.4557e+000 |
| 3.4000e+001 | 1.2062e+000 | 7.9363e+000 | 4.2899e+000 |
| 3.5000e+001 | 1.2208e+000 | 7.6450e+000 | 4.1325e+000 |

FIG. 17

METHOD AND APPARATUS FOR DOPPLER COMPENSATION IN A SATELLITE COMMUNICATIONS SYSTEM

FIELD OF THE INVENTION

The present invention relates generally to the field of satellite communications systems. More particularly, the present invention relates to a method and apparatus for Doppler compensation in a satellite communications system having multiple channels.

BACKGROUND OF THE INVENTION

Inmarsat is an international organization providing satellite communications services to ships at sea, land-mobile operations, and aircraft. SATCOM communication links generally provide for telephone services (e.g., spoken voice, PC data, and FAX communications) and packet data communications (e.g., computer-to-computer communications via X.25 protocol). The SATCOM concept for Inmarsat is to bring airborne intelligent communications services to aircraft.

Referring to FIG. 1, Inmarsat SATCOM communications network 10 includes an Aircraft Earth Station (AES) 12 and a Ground Earth Station (GES) 14 in communication with a satellite 16 via radio links 18 and 20, respectively. GES 14 communicates with a plurality of user devices 22 via a Packet Switched Data Network (PSDN) 24 and a Packet Switched Telephone Network (PSTN) 26. User devices 22 include, for example, a telephone 28, a facsimile (FAX) machine 30, and a modem-equipped personal computer (PC). Telephone 28 can be any type of voice communication system including cellular phones, PHY phones, digital phones, analog phones, as well as other voice communication devices. PSDN 24 and PSTN 26 are telecommunications networks which provide international ground communications services and can include any type of ground communication services.

AES 12 includes a SATCOM communications terminal mounted within an aircraft. The term "Earth Station" in AES 12 is indicative of the aircraft being an earth station with respect to satellite 16 since the aircraft is not high above the earth compared to the altitude of satellite 16 above the earth. AES 12 provides telephone, FAX and PC data communications services for both aircraft crew and passengers. AES 12 also provides in-flight entertainment and special services such as broadcast news briefs, reservations and catalog sales.

For simplicity, FIG. 1 shows only one AES 12, one GES 14 and one satellite 16. Network 10, however, may include more than one AES 12, GES 14 and satellite 16. For example, multiple aircraft may communicate with each satellite 16, multiple satellites 16 provide coverage for multiple regions around the earth, and multiple GES 14's may operate in the region covered by each satellite 16. Similarly, user devices 22 may include more than one telephone 28, FAX machine 30 and/or PC 32.

Referring to FIG. 2, link 18 between AES 12 and satellite 16 may include six radio channels with three data channels 34–38 and three circuit channels 40–44. All six channels communicate digital data. Data channel 34 radiates or communicates from satellite 16 to AES 12 and is referred to as the P Channel, and data channels 36 and 38 radiate from AES 12 to satellite 16 and are referred to as the R and T Channels, respectively. Channels 34–38 communicate packet data traffic between computers. Circuit channels 40–44 radiate in both directions between satellite 16 and AES 12, and are referred to as C Channels. Circuit channels 40–44 communicate regular telephone calls (e.g., generically referred to as "voice channels" herein, even though FAX or PC modem data may also be communicated).

P Channel 34 is radiated continuously, and is used to communicate data needed for call setup. P Channel 34 is known as the "forward link" since it links up to the aircraft. R and T Channels 36 and 38 are the return links for communicating data (e.g., aircraft positioning data, passenger fax data, etc.) back to satellite 16. Each AES 12 which communicates via the same satellite 16 uses the same frequencies for P, R and T Channels 34–38.

In contrast, C Channel frequencies are unique for each particular telephone call. A particular C Channel frequency pair is assigned to each telephone call. When the call terminates, the frequency is returned to a pool so it can later be re-assigned to another telephone call. "Circuit channel" originally referred to the copper link between telephones in old telephone networks, but is used herein to refer to a telephone circuit channel or connection generally.

FIG. 2 shows a four-channel AES 12. The signal in each channel type is processed by a channel unit. Thus for a four-channel AES, there is one channel unit for packet data communications (i.e., P, R/T) and three for circuit mode communications. Each channel unit consists of both transmitter and receiver circuitry. The data and C Channel units are identical in circuitry but differ in software programming. Configuration of the channel units may depend on the aircraft application. If an application does not require the communication of data packets (i.e., "circuit-mode services only"), the P, R and T Channel Unit can be configured as a circuit channel instead. For example, AES 12 would be configured to provide four C Channels for telephone communications if the P, R and T Channels were not needed for communicating data traffic. However, as explained below, conventional AES terminals must continue to reserve a data channel unit 34 as a data channel.

During operation, AES 12 and satellite 16 move with respect to ground (i.e., GES 14) and with respect to each other. Commercial passenger and cargo aircraft typically cruise at ground speeds exceeding several hundred miles per hour. Satellite 16 also moves with respect to ground. The relative movement between AES 12 and satellite 16, and between satellite 16 and GES 14, induces a Doppler shift in the frequency of radio signals being transmitted between these components.

Compensation for Doppler frequency shift is applied to correct the signals to maintain the signals within the system frequency error budget specified by Inmarsat. Exceeding this error budget may cause adjacent signals to interfere with each other. It is relatively easy for AES 12 to compensate for Doppler shift on received signals by listening to incoming signals and adjusting the frequency of the receiver appropriately. However, it is difficult for GES 14 to compensate for Doppler shift in received signals since GES 14 may need to communicate with many aircraft in its region, so that GES 14 would be required to track Doppler shift separately for each aircraft.

To solve this problem, Inmarsat requires that each AES 12 transmit all of its signals to satellite 16 within a defined frequency tolerance (e.g., 100 or 185 Hz). To meet the requirement, AES 12 listens to signals received on P Channel 34, which are continuously available, and measures the frequency error between received P Channel signals and the known P Channel transmission frequency. It is assumed that this error is caused by Doppler shift. AES 12 uses the measured error to determine an expected Doppler shift for each transmission based upon the ratio of the P Channel receive frequency to the R, T and C Channel transmit frequencies, and applies the expected Doppler shift to correct the transmissions on the R, T and C Channels to compensate for the Doppler shifts. Thus, the frequency error budgets will not be exceeded.

No resources are wasted if the aircraft application has a data communications requirement since the P Channel used for monitoring Doppler shift is needed for other purposes. If, however, an application does not require data communications (i.e., circuit-mode services only), AES 12 does not need a channel allocated for receiving P Channel signals for use in communicating data packets. However, in this situation, conventional AES terminals continue to reserve one channel for receiving P Channel signals for the sole purpose of monitoring Doppler shift. P Channel signals are conveniently used for this purpose since these signals are continuously available.

Thus, in a circuit-mode services only application, one channel of the four-channel AES terminal shown in FIG. 2 would continue to be configured as a data channel for the sole purpose of measuring Doppler shift based on the frequency of the P Channel inputs. Only the other three channels could be used as circuit channels. A customer purchasing a SATCOM radio terminal capable of supporting five voice telephone calls must therefore purchase a six-channel terminal since one channel must be reserved for monitoring P Channel traffic. In general, customers who need only circuit-mode services are forced to order an AES terminal equipped with one more channel than the number of telephone calls the system must support. The additional channel needed is a costly, wasted resource.

One method that has been used in an attempt to address this problem is to pre-compensate the transmit frequencies based on a calculated Doppler shift rather than a measured Doppler shift. The method calculates the Doppler shift using the satellite location, the aircraft location, and data which defines flight characteristics (e.g., velocity, ground speed, heading pitch, roll, etc.). Much of the data needed to calculate the Doppler shift comes from the aircraft's Inertial Reference System (IRS). This method has been difficult to implement due to the many different types of IRS systems which are made by many manufacturers and provide inconsistent flight data. Thus, it has been difficult to produce an AES terminal which calculates Doppler shift and is compatible with different aircraft.

Accordingly, it would be advantageous to provide an improved AES terminal or communication system which can be used in circuit-mode services only applications and is not required to reserve a channel unit solely for monitoring P Channel input signals. Customers of this AES terminal would not need to buy a radio terminal equipped with one more channel unit than the number of circuit channels actually needed. It would also be advantageous to provide a multichannel terminal for satellite communications wherein transmissions remain within a specified frequency error budget even with each channel configured as a circuit channel. It would also be advantageous to provide a method for measuring Doppler shift in an AES terminal or communication system independent of P Channel inputs.

SUMMARY OF THE INVENTION

One embodiment of the invention relates to an AES terminal for satellite communications capable of use in circuit-mode services only applications. The terminal includes multiple channel units and a processing circuit. Each channel unit receives a circuit channel input having a known transmitted frequency and transmits a circuit channel output at an adjustable transmit frequency. Each channel unit can measure the frequency of its received input and adjust the frequency of its transmitted output. The processing circuit measures Doppler shift based upon a difference between the measured and known transmitted frequencies of at least one circuit channel input, determines a Doppler correction for each transmitted output based on the measured Doppler shift, and applies the Doppler correction to adjust the frequency of each transmitted output to correct for Doppler shift.

Another embodiment of the invention relates to a SATCOM terminal for providing communications services between an aircraft and a satellite. The terminal has one configuration option adapted for providing circuit-mode services only and at least one configuration option adapted for providing at least some data packet services. Multiple channel units communicate signals via channels between the aircraft and satellite. Each unit operates as a data or circuit channel, receives a channel input having a known transmitted frequency, and transmits a channel output at an adjustable transmit frequency. Each channel unit can measure the frequency of its received input and adjust the frequency of its transmitted output. A processing circuit, when circuit-mode services only is selected, operates each of the channel units as a circuit channel, measures Doppler shift using differences between the measured and known transmitted frequencies of at least one channel input, determines a Doppler correction for each transmitted output based on the measured Doppler shift, and applies the correction to adjust the frequency of each transmitted output to correct for Doppler shift.

Another embodiment of the invention relates to a method for Doppler shift compensation in a satellite communications terminal for an aircraft during circuit-mode services only communications. The terminal includes multiple channel units which provide circuit channels to support telephone calls. The method includes receiving at least one circuit channel input that was transmitted by a communications satellite at a known frequency. The frequency of each input depends upon the known transmit frequency and relative velocity between the aircraft and satellite. The method includes measuring the frequency of the at least one received input, calculating a Doppler error value for the at least one input as a difference between its measured and known transmit frequencies, determining a Doppler correction value for each circuit channel transmission using the Doppler error value, and applying the correction value to each transmission.

BRIEF DESCRIPTION OF THE DRAWINGS

The invention will become more fully understood from the following detailed description, taken in conjunction with the accompanying drawings, wherein like reference numerals refer to like parts, in which.

Figure 4:
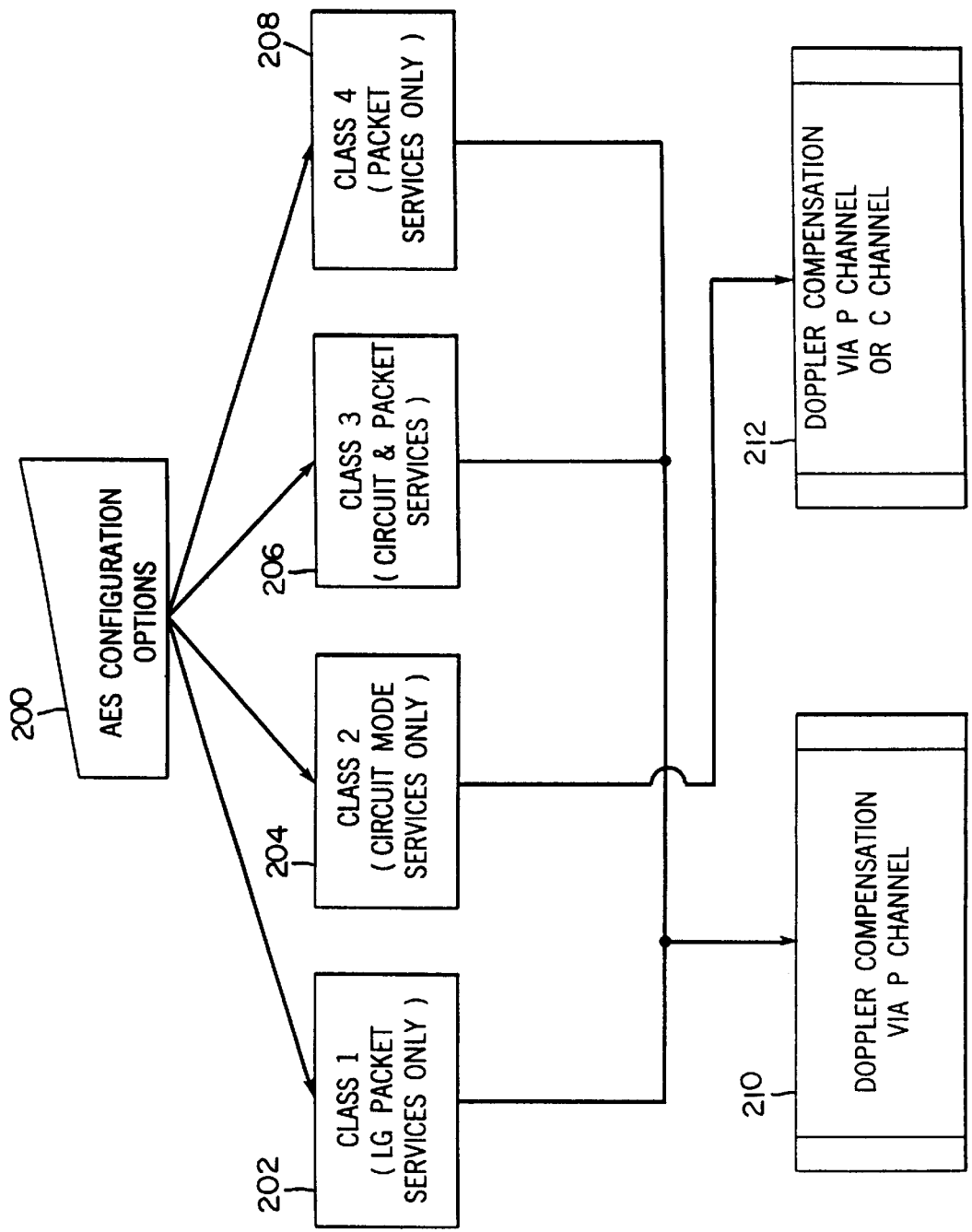
FIG. 4 is a high-level flow chart of the Doppler compensation process performed by the improved AES of FIG. 3 which shows Doppler shift measured via P Channel input, or via P Channel or C Channel or C Channel & Inertial Reference System (IRS) input.
Figure 5:
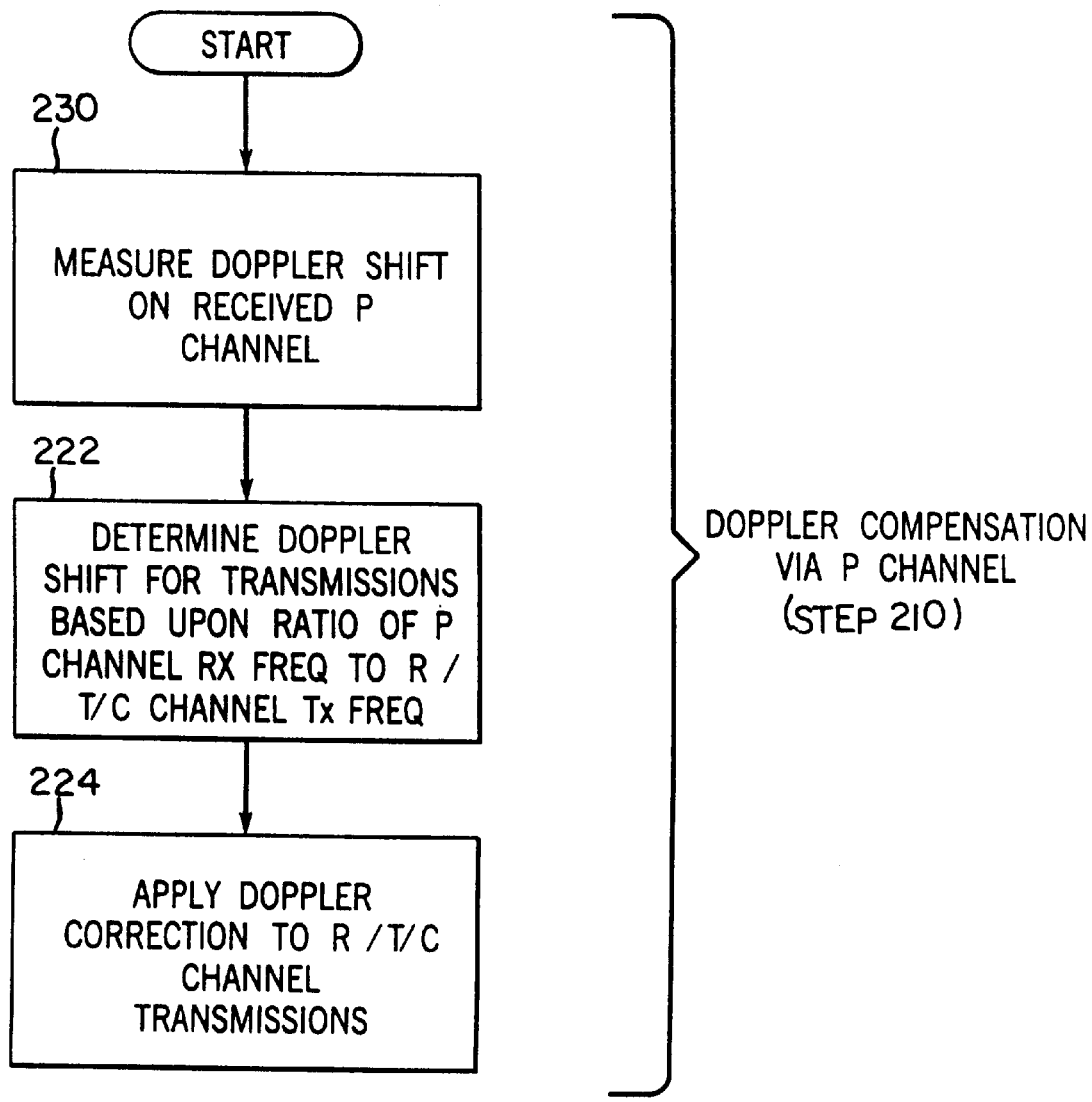
Figure 6:
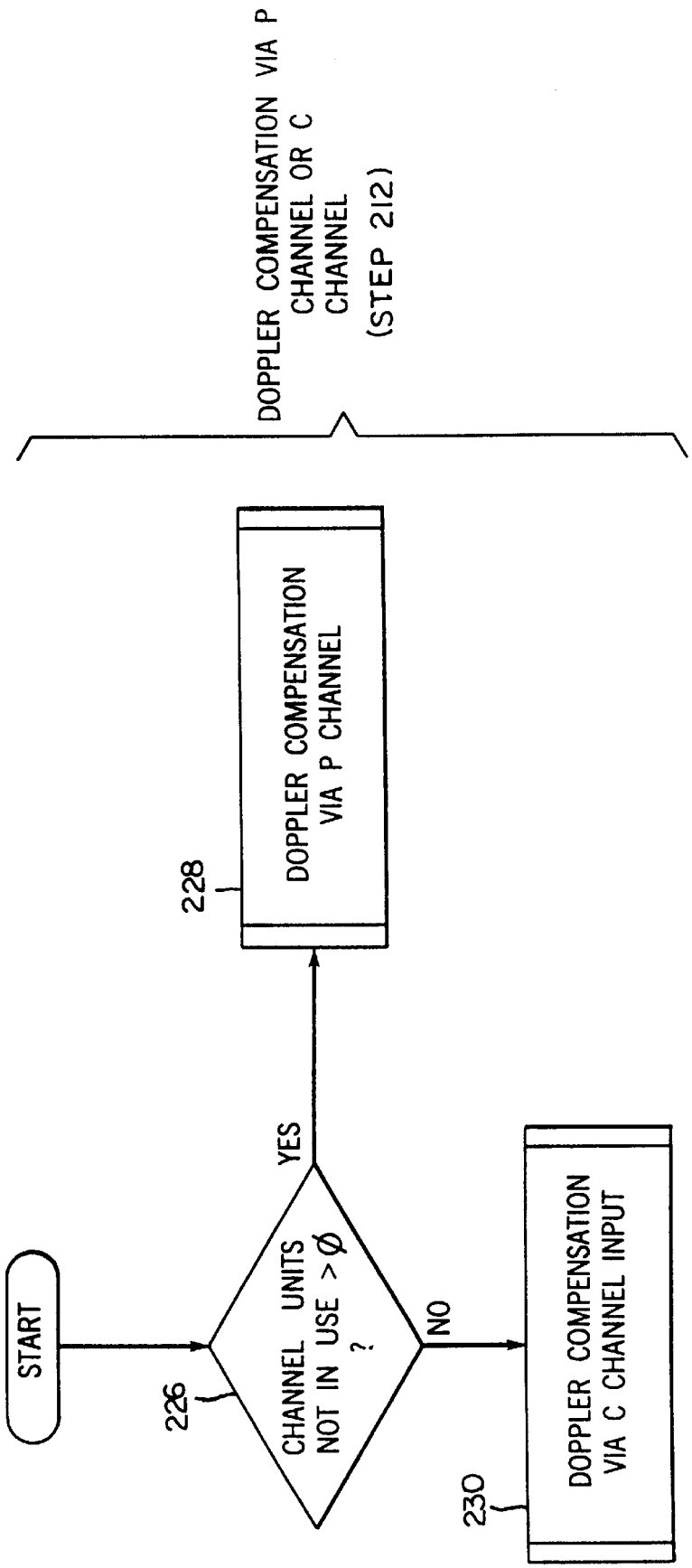
Figure 7:
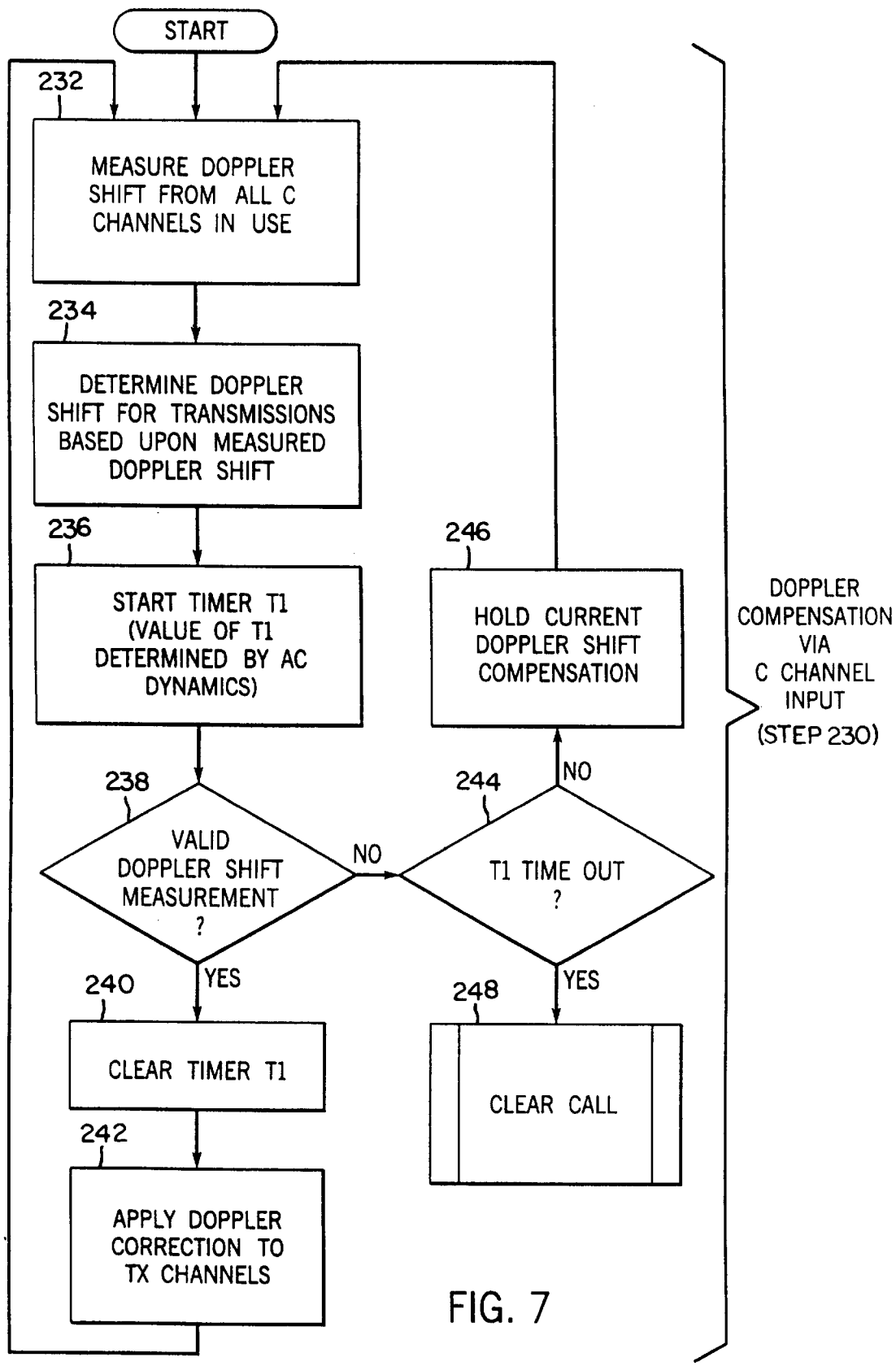
Figure 8:
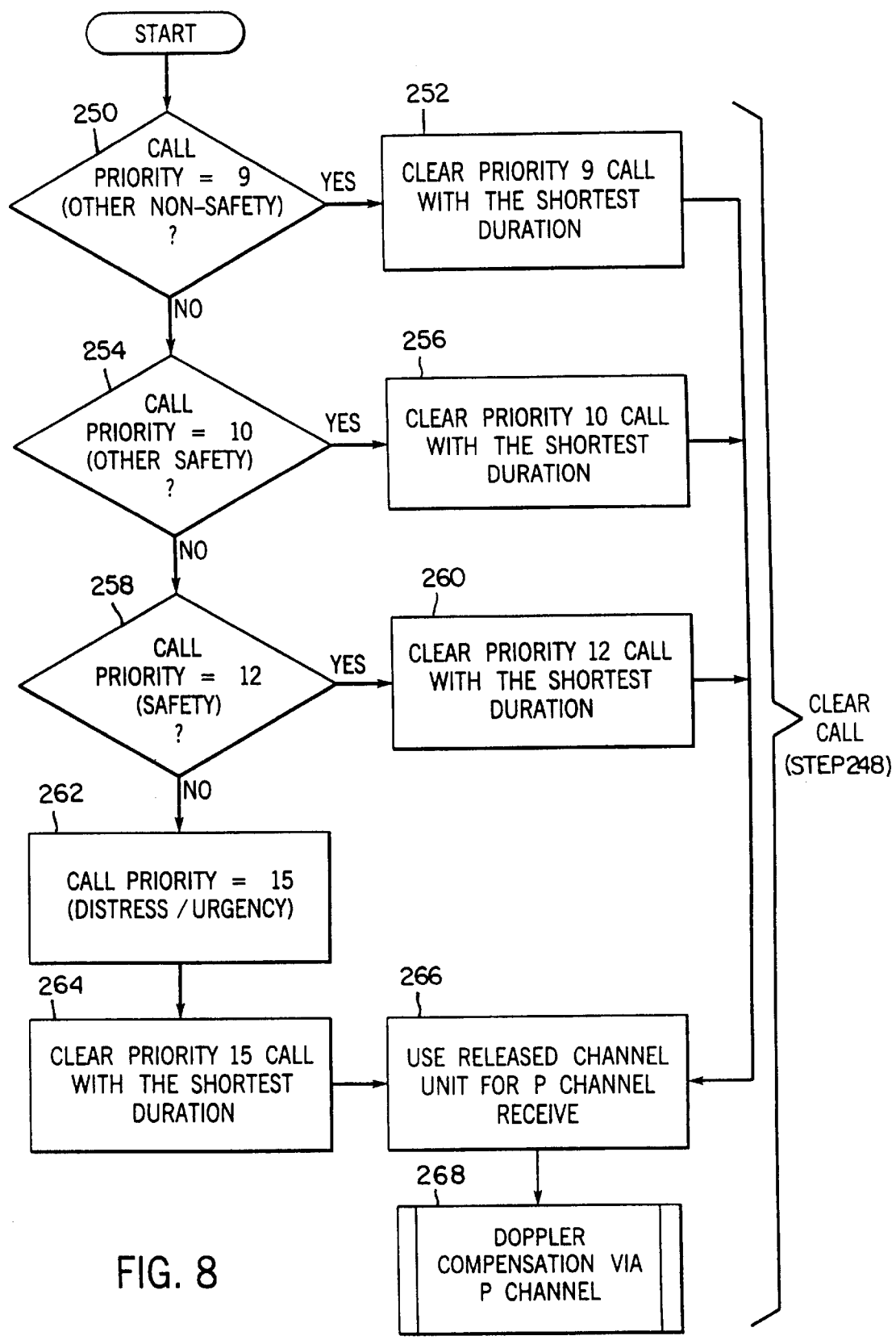
Figure 9:
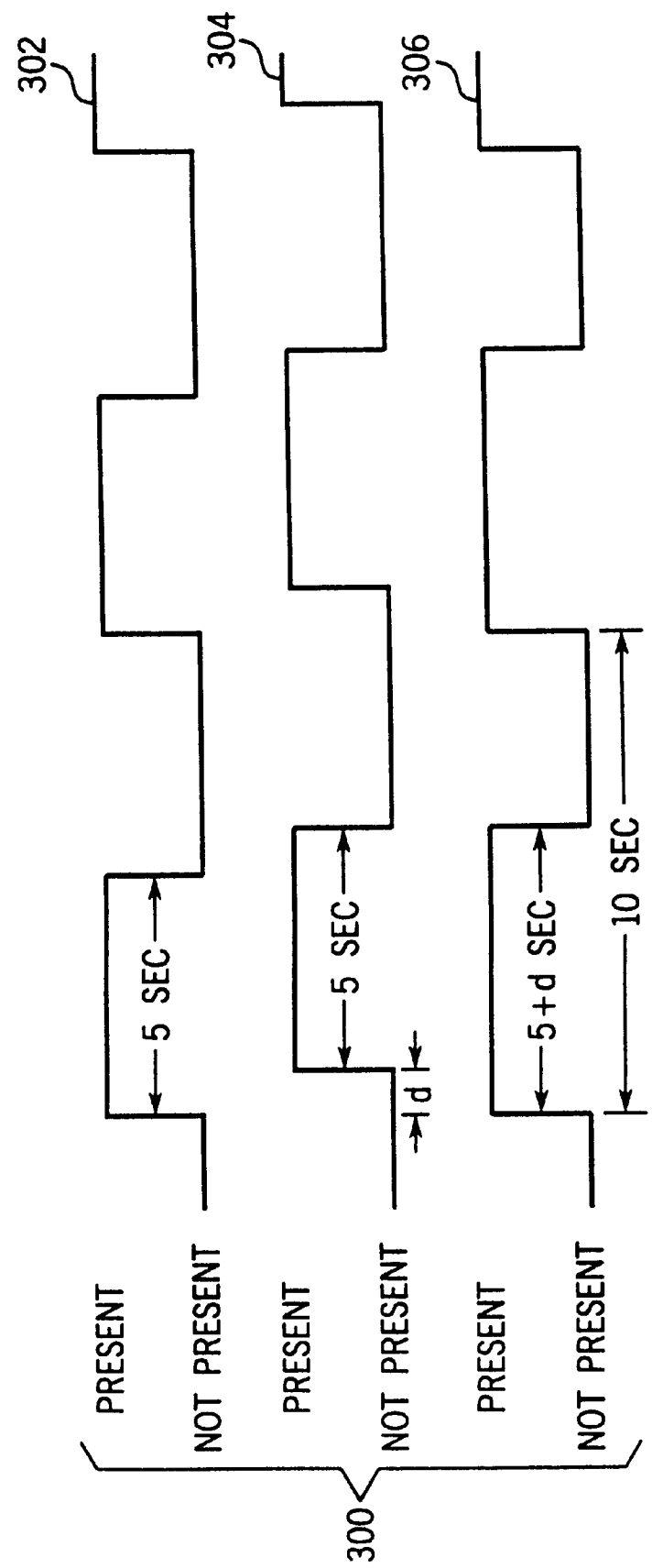
Figure 10:
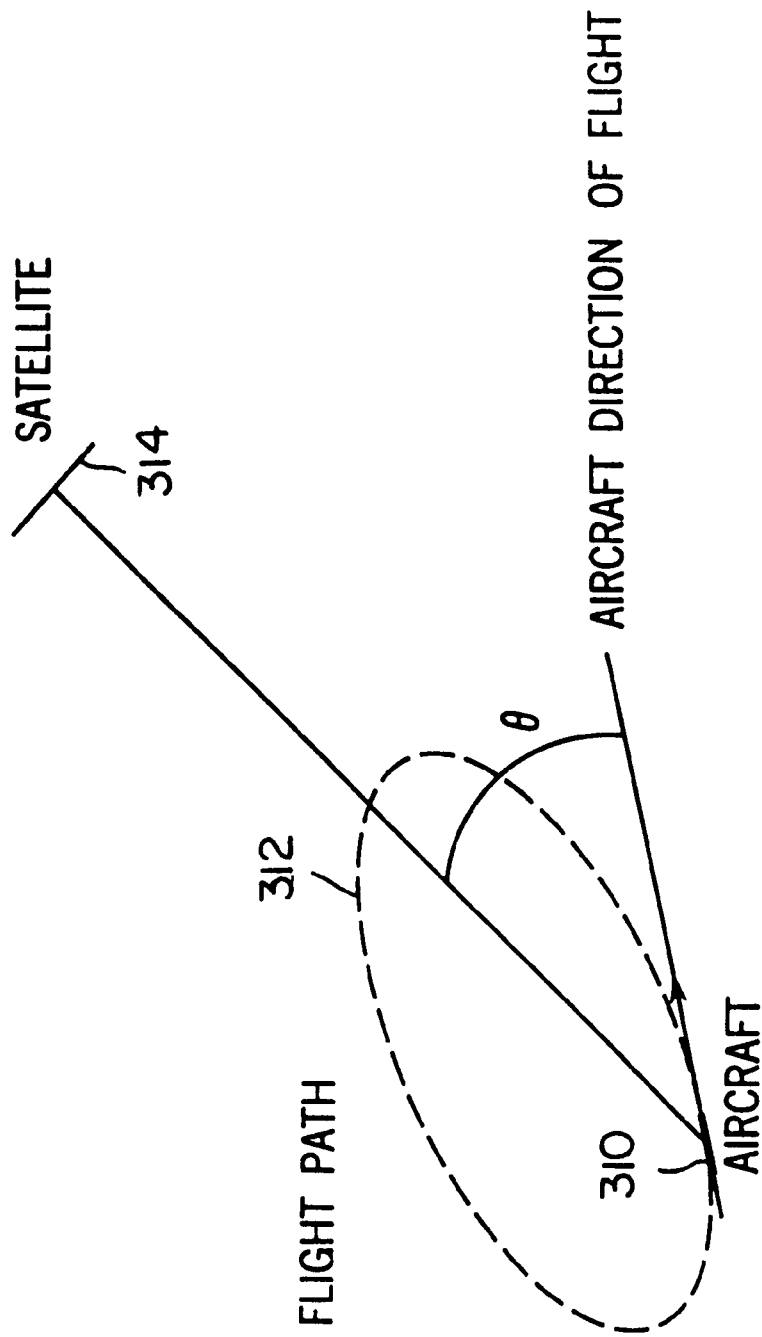
Figure 11:
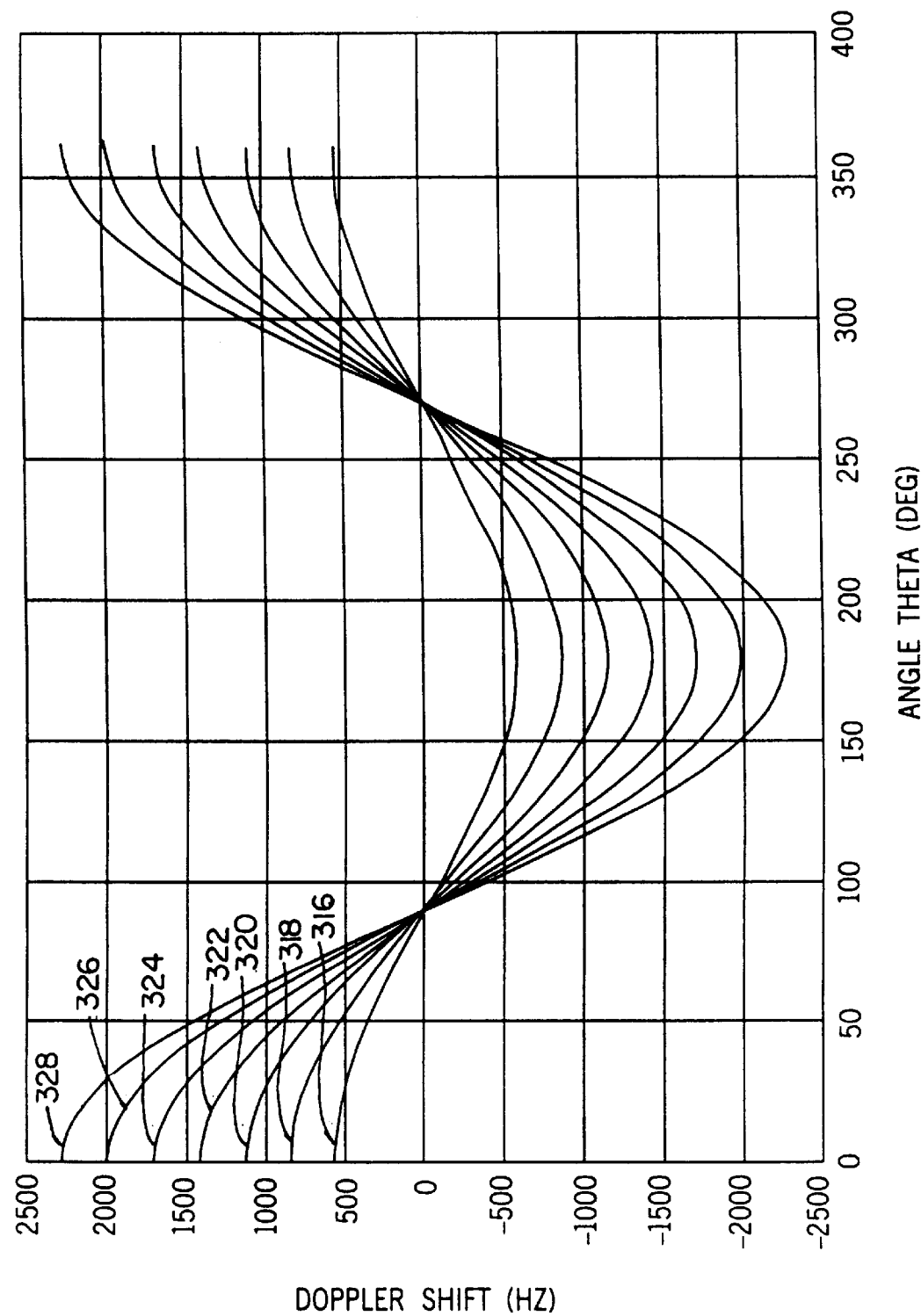
Figure 12:
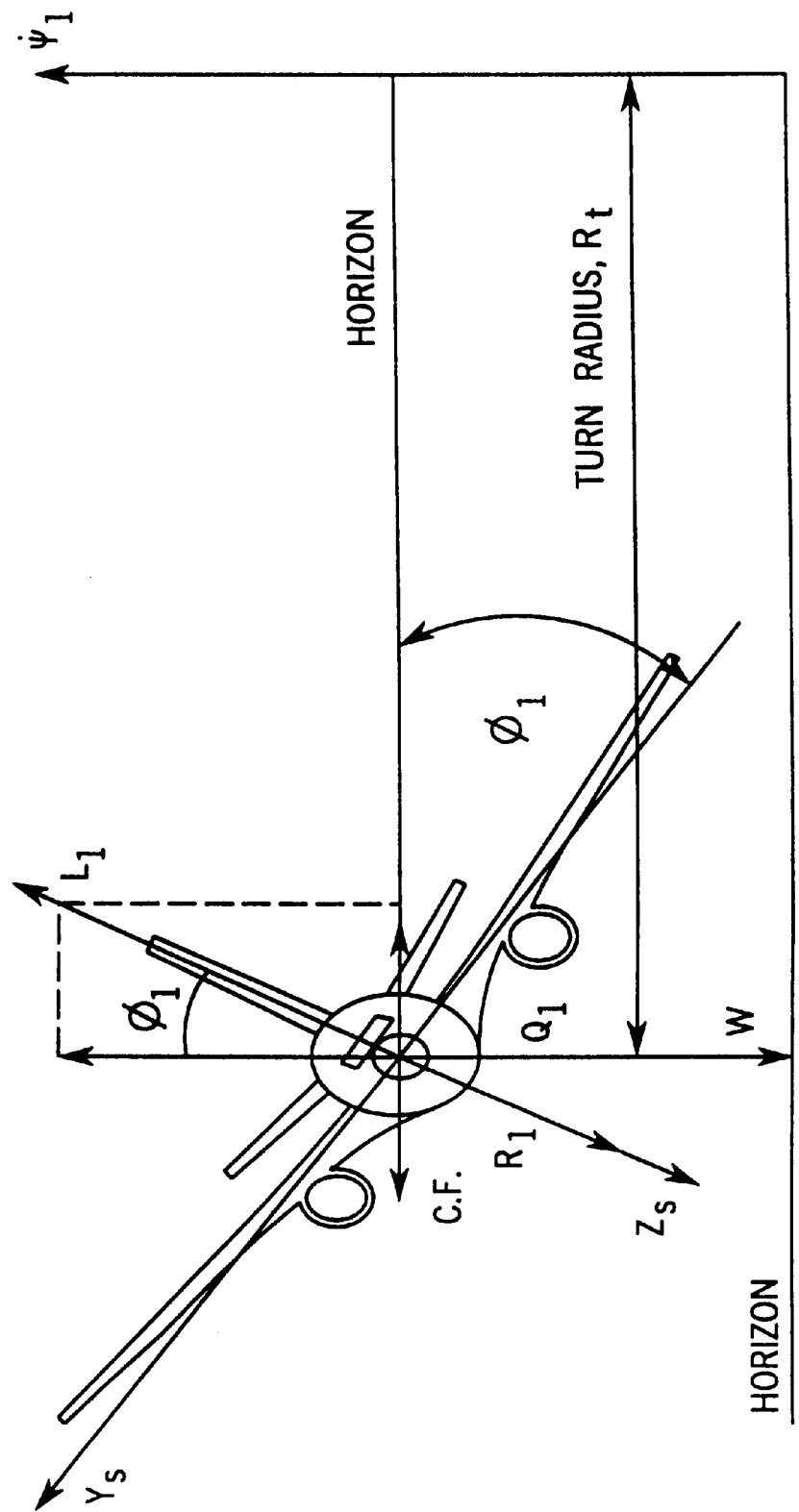
Figure 13:
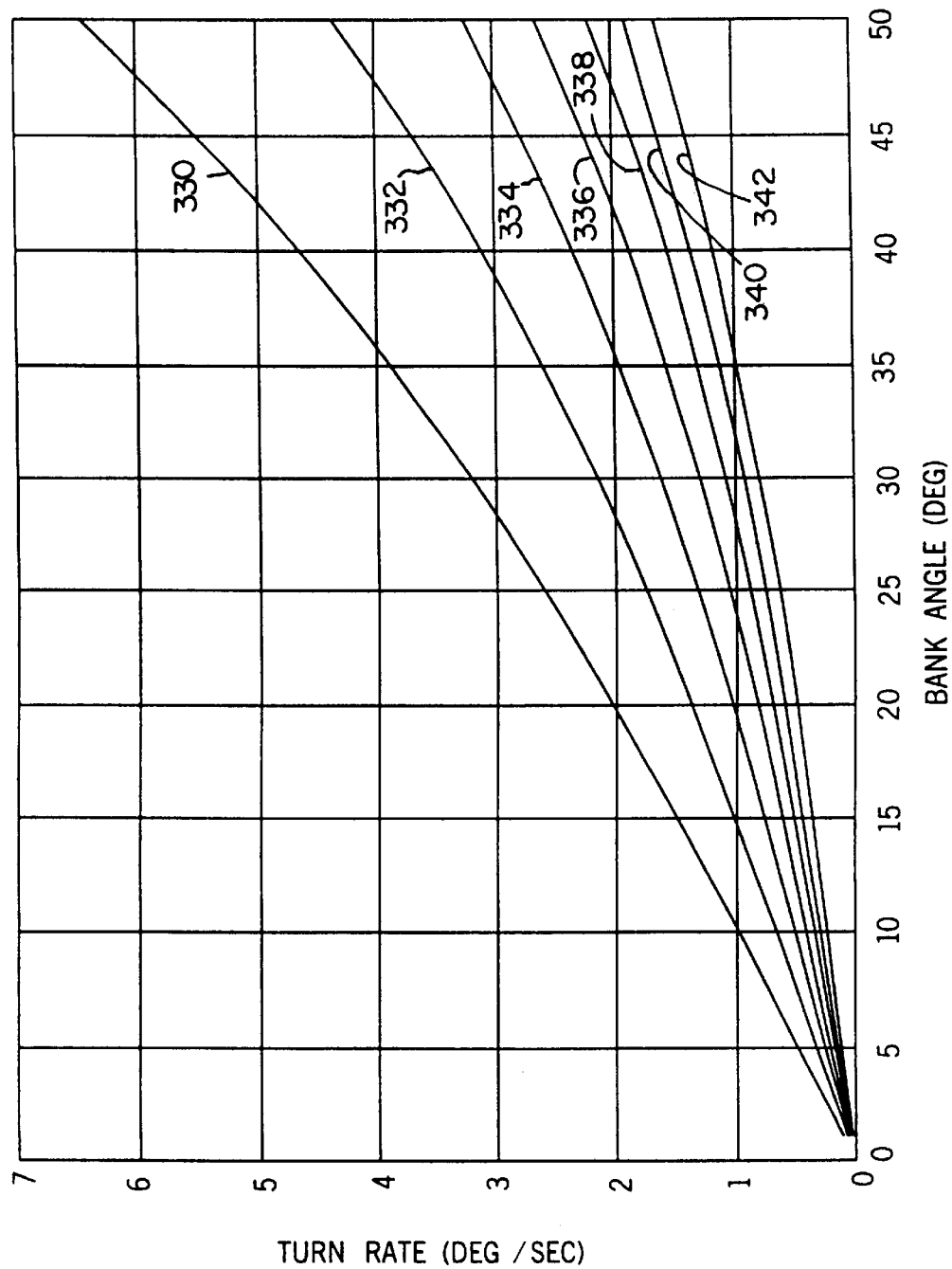
Figure 14:
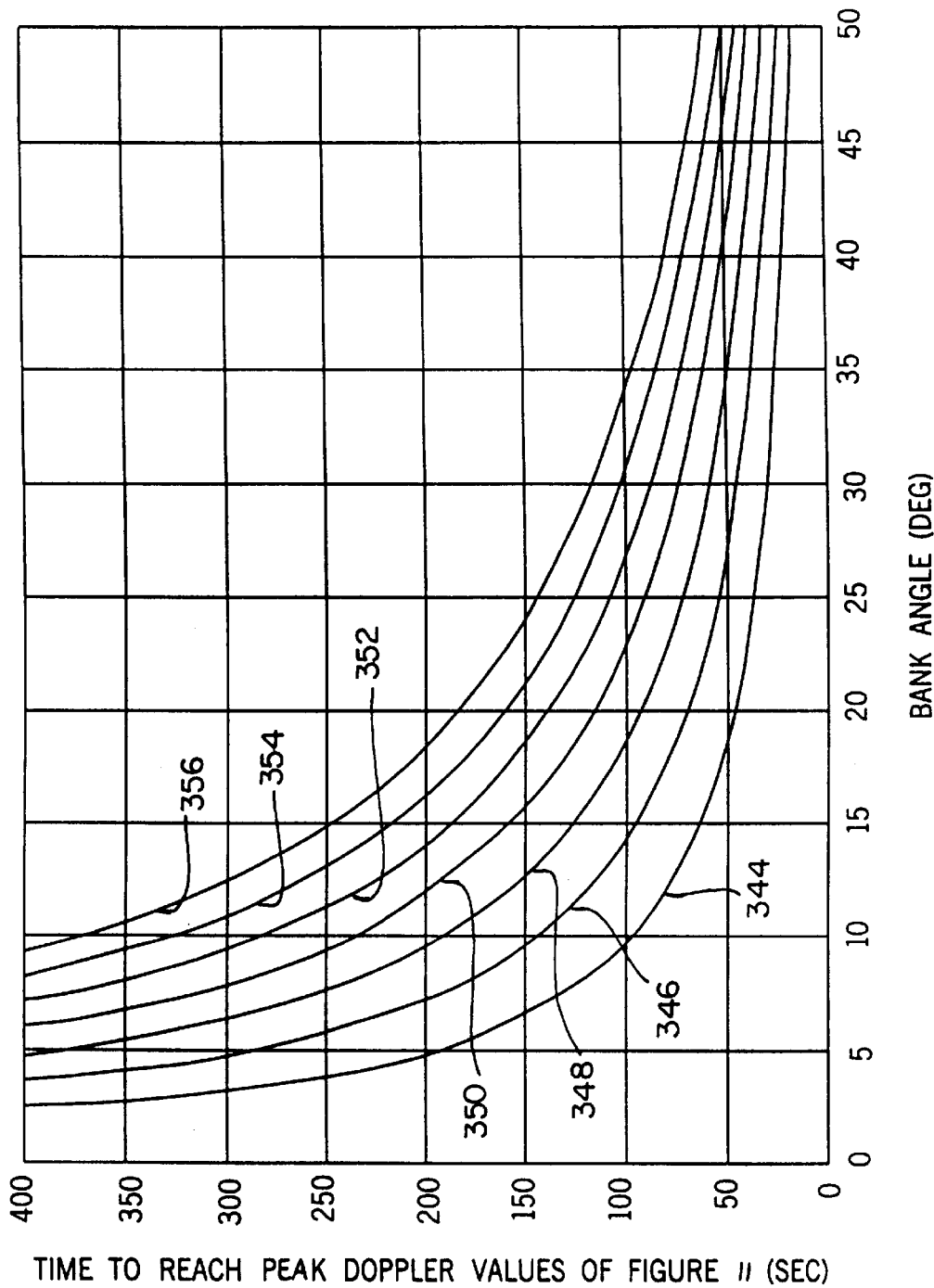
Figure 16:
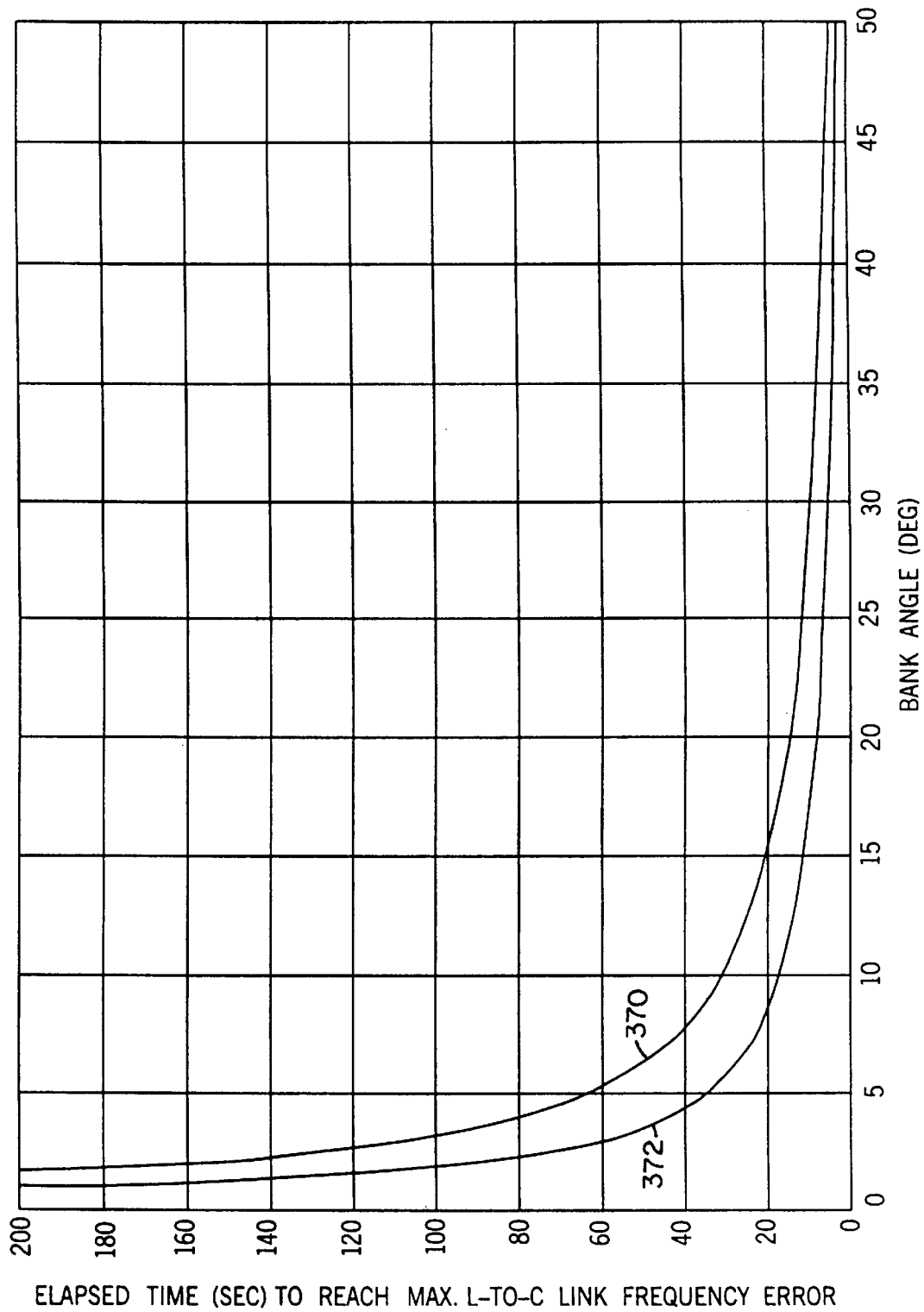

FIG. 5 is a flow chart of the Doppler compensation via P Channel input sub-process of FIG. 4;

FIG. 6 is a flow chart of the Doppler compensation via P Channel or C Channel or C Channel & IRS input sub-process of FIG. 4;

FIG. 7 is a flow chart of the Doppler compensation via C Channel input sub-process of FIG. 6;

FIG. 8 is a flow chart of the Clear Call sub-process of FIG. 7;

FIG. 9 is a timing diagram for a two-channel AES terminal which shows when C Channel inputs are present;

FIG. 10 represents an aircraft flight path scenario (i.e., coordinated turn) representing worst case Doppler conditions for determining the value of timer T1;

FIG. 11 represents Doppler characteristics for different values of aircraft speed and for one complete turn around the aircraft flight path shown in FIG. 10;

FIG. 12 shows the geometry of the coordinated turn;

FIG. 13 is a plot of the aircraft turn rate against bank angle as a function of aircraft ground speed;

FIG. 14 is a plot of the elapsed time to reach peak Doppler values against bank angle as a function of aircraft ground speed;

FIG. 15A is a plot of the elapsed time to reach peak Doppler values that are shown in the plot of FIG. 15B;

FIG. 16 is a plot of the elapsed time to reach system frequency error budgets of 185 Hz and 100 Hz for the L-to-C link from an initial value of 0; and FIG. 17 is a table showing the elapsed time to reach the system frequency error budgets of 185 Hz and 100 Hz.

DETAILED DESCRIPTION OF THE PREFERRED EMBODIMENTS

Figure 1:
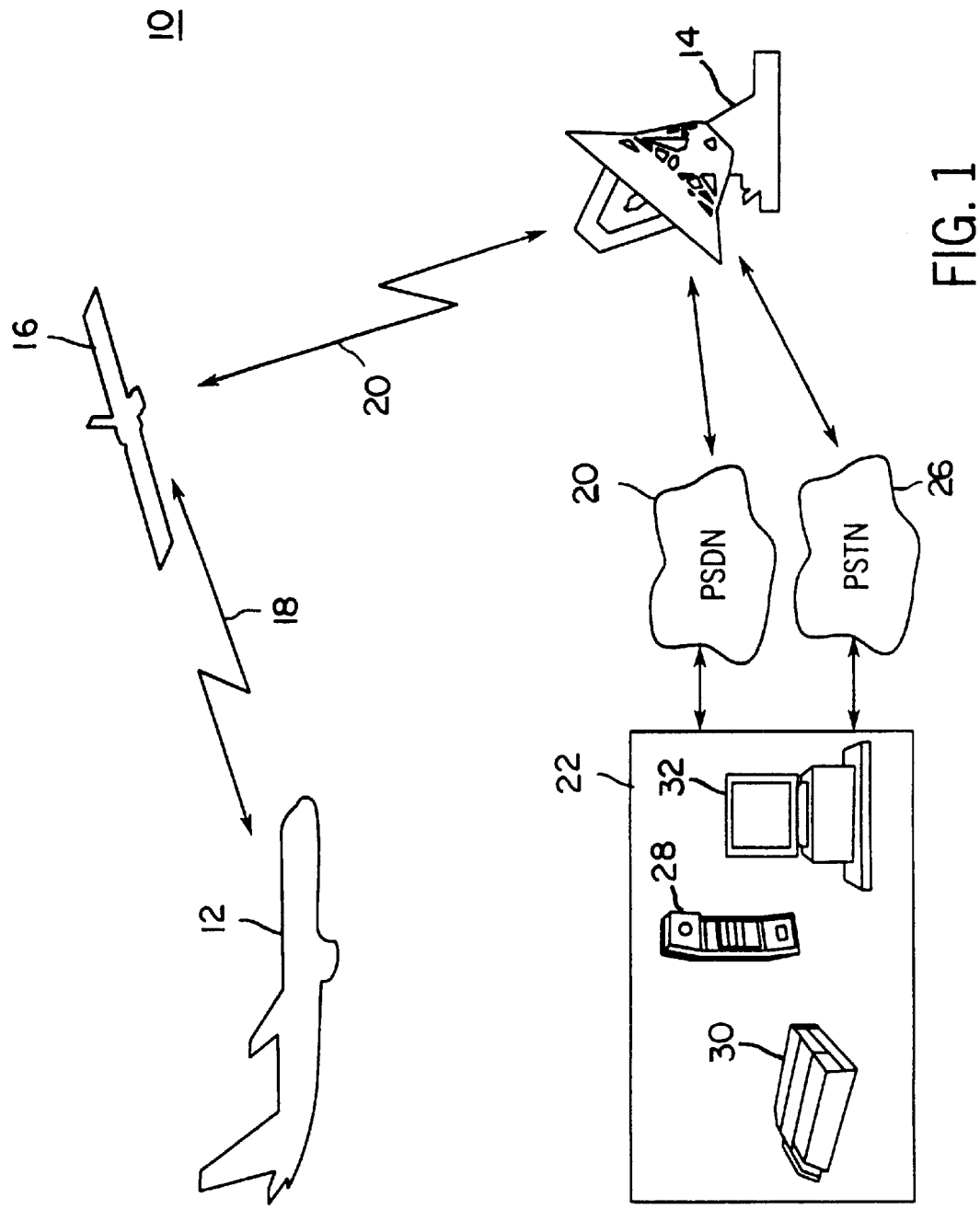
FIG. 1 is a diagram of a satellite communications network including an Aircraft Earth Station (AES), an INMARSAT satellite, and a Ground Earth Station (GES)
Figure 2:
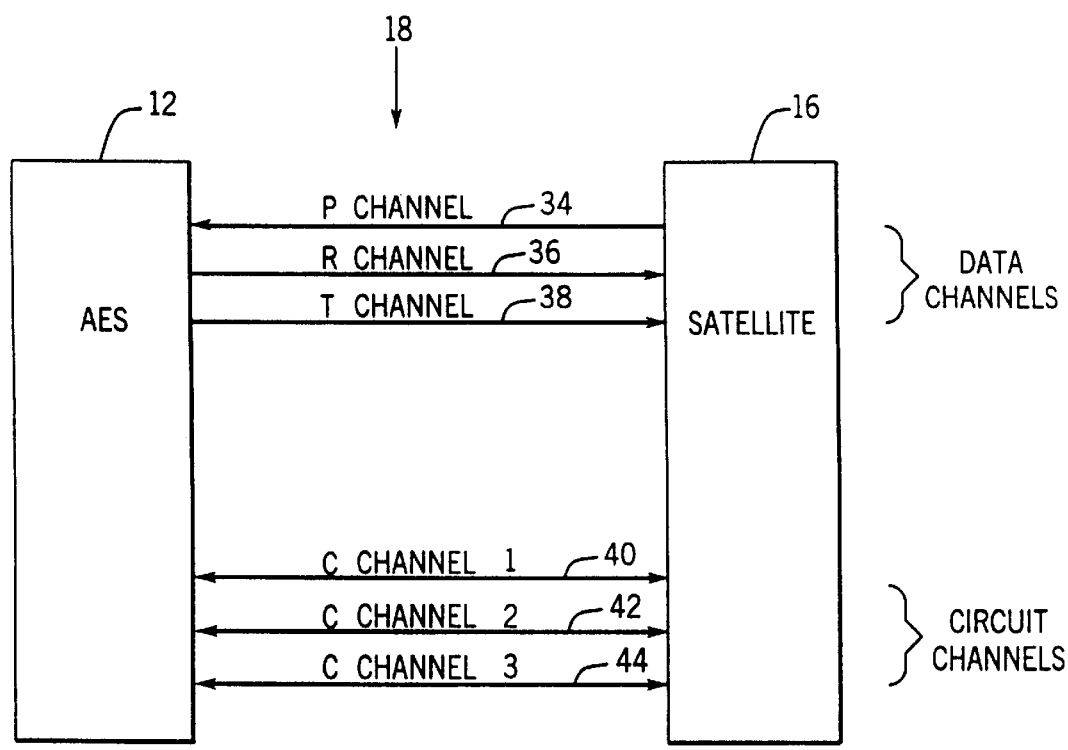
FIG. 2 is a diagram showing communication paths between the AES and satellite of FIG. 1.
Figure 3:
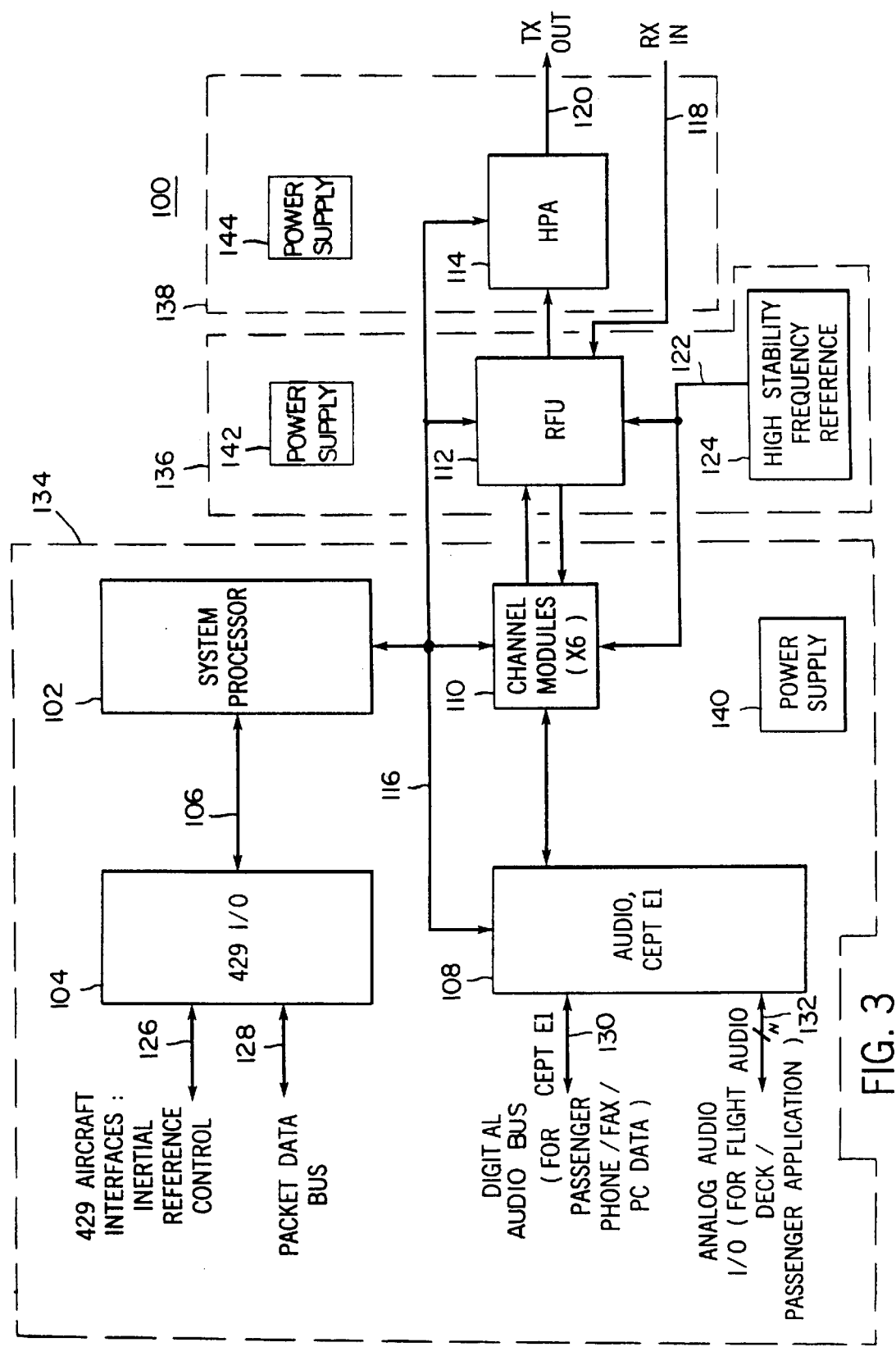
FIG. 3 is a block diagram of an improved AES satellite communications terminal.

Referring to FIG. 3, an AES terminal 100 for SATCOM satellite communications includes a system processor 102 (e.g., an Intel 486 microprocessor) coupled to an ARINC-429 Input/Output (I/O) interface circuit 104 via a bus 106, and to an audio/Cept E1 interface circuit 108, six channel units 110, a Radio Frequency Unit (RFU) 112, and a High-Power Amplifier (HPA) unit 114 via bus 116. Channel units 110 communicate Audio and Cept E1 signals with interface circuit 108, receive radio signals (RX In) 118 via RFU 112, and transmit radio signals (TX Out) 120 via RFU 112 and HPA 114. Channel units 110 and RFU 112 each receive a high stability frequency reference signal 122 from a highly-accurate frequency reference circuit 124. AES terminal 100 can be used in place of AES 12 in FIG. 2.

Circuit 104 provides ARINC-429 links 126 and 128 to the aircraft's Inertial Reference System (IRS) and Packet Data Bus (PDB), respectively. Circuit 108 provides a Cept E1 link 130 to the aircraft Digital Audio Bus (DAB) and also provides analog audio I/O signals 132. The DAB is used for transmitting passenger telephone, FAX, and PC modem data. Analog audio I/O signals 132 are provided for both flight deck and passenger audio applications.

Each channel unit 110 can be configured by system processor 102, appropriately programmed, to implement a P, R, T or C Channel. Allocation of channel units 110 among these channels depends on the configuration option selected for AES terminal 100, as described below.

In one embodiment, the hardware implementation of AES terminal 100 includes a SATCOM 906 six-channel voice and data satellite communications system available from Collins Avionics & Communications Division of Rockwell International Corporation of California. The SATCOM 906 is an Inmarsat-based SATCOM radio based on the ARINC 741 architecture which includes three electronic packages as denoted by dashed lines in FIG. 3. The packages include an SDU 906 package 134, an RFU 906 package 136, and an HPA 900/901/901A package 138. Packages 134, 136 and 138 include a power supply 140, 142 and 144, respectively. Alternatively, the hardware components of AES terminal 100 could all be packaged within a single package with a single power supply (e.g., SRT-2000 and SAT-2000 products also available from Rockwell International Corporation). Additionally, other architectures than the ARINC 741 architecture can be used to implement a satellite communications terminal in accordance with the invention.

System processor 102 is programmed to execute logic shown by the flow charts of FIGS. 4–8. Referring to FIG. 4, AES terminal 100 operates in any of four user-selected configuration options referred to herein as Class 1, 2, 3 or 4. The AES configuration option for AES terminal 100 is selectable by hardware jumpers or strapping pins (not shown) which are read by system processor 102 at step 200. Depending upon the configuration option selected, processor 102 operates in Class 1 at step 202, Class 2 at step 204, Class 3 at step 206, or Class 4 at step 208. Alternatively, a user interface can be provided for selecting a mode via switches, buttons, keyboards, or dials.

Class 1 is for "Low Gain (LG) Packet Services Only", which provides only data package communication services using a low gain (e.g., 0 dB) antenna for a 600 or 1200 bits/second service rate. Class 2 is for "Circuit Mode Services Only", providing only circuit mode communication services. Class 3 is for "Circuit and Packet Services", providing data package and circuit mode communication services. Class 4 is for "Packet Services Only", providing only data package communication services as in Class 1, but using a higher gain antenna than Class 1.

Classes 1, 3 and 4 provide data packet communication services (with or without circuit mode services). Since data packet communications are required, 1 channel unit 110 of AES terminal 100 is configured for the P, R and T Channels in Classes 1, 3 and 4. Since P Channel signals are received in each of these classes, P Channel inputs are used to compensate for Doppler shift at step 210.

When the Class 2 configuration option is selected, however, only circuit-mode communications services occur. In this situation, conventional AES terminals continue to reserve one channel to receive P Channel inputs for the purpose of monitoring Doppler shift. Thus, conventional AES terminals perform Doppler shift compensation via P Channel for Classes 1, 2, 3 and 4. The channel reserved for receiving P Channel inputs for Doppler compensation in Class 2, however, represents a wasted resource since P Channel is not otherwise needed for data communications.

To avoid the need to reserve an extra channel unit 110 for receiving P Channel inputs in Class 2, AES terminal 100 can compensate for Doppler shift based upon the measured Doppler shift of signals received on either the P Channel or C Channel at step 212. Thus, terminal 100 does not require an extra channel unit 110 reserved for receiving P Channel inputs.

Since, in circuit-mode services only applications, each channel unit 110 can be configured as a C Channel, AES terminal 100 need only be equipped with a number of channel units 110 equal to the required number of circuit channels, not the required number plus one. The ability to reduce the number of channel units 110 by one in AES 100 is advantageous since channel units 110 are costly. Further, applications requiring N circuit channels can be satisfied with one N-channel AES terminal instead of two 4 channel terminals. Purchasing one terminal rather than two may yield an even larger cost savings than a reduction of one unit 110.

Referring to FIG. 5, AES terminal 100 performs Doppler frequency compensation via P Channel input at step 210 by measuring Doppler shift on the received P Channel signals at step 220, determining Doppler shift for transmissions based upon the ratio of the measured P Channel receive frequency to R, T and C Channel transmit frequencies at step 222, and applying Doppler corrections to the R, T and C Channel transmissions at step 224.

At step 220, AES terminal 100 measures Doppler shift by configuring a channel unit 110 to search for, acquire, and lock onto the P Channel. After the P Channel input is locked in, high stability frequency reference signal 122 prevents receiver drift. The difference between the frequency of the locked-on P Channel signal and the known transmit frequency of this signal is assumed to be due to Doppler shift. In other words, since P Channel inputs are transmitted at a known frequency, and since receiver drift is prevented, any error in the P Channel input is assumed to be caused by Doppler shift due to relative movement between AES 12, GES 14 and satellite 16.

To search for, acquire and lock onto the P Channel input, the channel unit 110 assumes the incoming signal will be within a frequency band (e.g., <1280 Hz) of the known P Channel frequency. Then, the channel unit 110 searches back and forth within this band and looks for energy being acquired by a correlator set up to search for a unique bit pattern or "unique word". When found, the signal is locked in and the data is known.

At steps 222 and 224, AES 100 determines Doppler shift for transmissions at the frequencies of the R, T and C Channels, and applies Doppler correction to these transmissions. Doppler shift is characterized by:

$$F_{Doppler} = (1+v/c)*F \qquad (1)$$

wherein $F_{Doppler}$ is the received frequency, v is relative velocity between satellite 16 and the aircraft, c is the speed of light, and F is the actual generated frequency.

Doppler error equals the difference between F and $F_{Doppler}$, or $(v/c*F)$. Thus, at a particular relative velocity, Doppler error depends upon the actual generated frequency, and Doppler error at one frequency will differ from the Doppler error at another frequency. Therefore, Doppler error depends on the percentage of the frequency.

To compensate for Doppler, the Doppler corrections for transmissions are determined based on the ratio of the P Channel receive frequency to the R, T and C Channel transmit frequencies. The percentage of Doppler shift on the received signal is applied in the opposite direction to each transmitted frequency (i.e., if Doppler shift on the received input is positive, the shift applied to the transmissions will be negative, and vice-versa). Thus, if the ratio of the received P Channel frequency to the generated P Channel frequency is x, frequencies of the transmitted R, T and C Channels must be shifted by 1/x.

For example, assume the receive frequency band has a low end of 1525 MHz and the transmit frequency band has a high end of 1660.5 MHz, and assume that Doppler shift for the received P Channel signal was measured at +1000 Hz. The Doppler shift value of the received P Channel is adjusted by the ratio of the transmit frequency to the receive frequency (i.e., 1000 Hz*(1660.5 MHz/1525 MHz)=1089 Hz), and is applied to the transmitted frequency in the opposite direction (i.e. −1089 Hz). Thus, to compensate for Doppler shift, the transmitted signal is transmitted at a frequency of:

$$1660.5 \text{ MHz} - 1089 \text{ Hz} = 1660.4989 \text{ MHz}$$

Thus, a positive shift for the received P Channel signal corresponds to a negative shift for transmissions, while a negative Doppler shift for the received signal would have corresponded to a positive shift for transmissions.

At step 224, the Doppler correction determined at step 222 is applied separately to each R, T and C Channel transmission from terminal 100. Doppler corrections are applied separately to each channel since the frequency of each transmission differs.

Referring to FIG. 6, AES terminal 100 performs Doppler compensation via P Channel or C Channel at step 212 by first determining the number of channel units 110 in use at step 226 and then performing Doppler compensation via P Channel input at step 228 if at least one channel unit 110 is not in use, or performing Doppler compensation via C Channel input at step 230 if all channel units 110 are in use.

If at least one channel unit 110 is not in use, AES terminal 100 has spare communications capacity. In this situation, using the otherwise unused channel unit 110 to measure Doppler shift via P Channel input does not waste resources. Thus, Doppler compensation is performed using P Channel input at step 228 just as it is performed for configuration Classes 1, 3 and 4 at step 210. However, if all channel units 110 are in use, Doppler compensation is performed via C Channel inputs at step 230 since no channel unit 110 is available to receive P Channel input.

Referring to FIG. 7, Doppler compensation via C Channel input at step 230 is shown. At step 232, Doppler shift is measured by determining the difference between the frequency received on each C Channel that is in use, and the known frequency for that C Channel. The measurement depends on the frequency each channel unit 110 must be slewed to maintain signal lock. The Doppler shift is measured from each C Channel in use, and a processing routine is used to determine the frequency error that will be used for Doppler compensation.

In one embodiment, if Doppler measurements are obtained by more than two C Channel inputs, the lowest and highest measured Doppler shifts are dropped and the remaining measurements are averaged. Dropping the lowest and highest measured shifts prevents a large error on one channel unit from affecting operation of the others. If only one Doppler shift measurement is obtained, its error is used. Other processing routines may also be used to measure Doppler shift from all the C Channels in use, or from only a portion of the C Channels. For example, all Doppler measurements obtained could be averaged, or only one measurement obtained (e.g., the first) could be used.

At step 234, the Doppler shift for transmissions is determined using the Doppler shift measured at step 232. This step is similar to step 222, except that Doppler shift is measured using the C Channel inputs at the C Channel frequencies rather than the P Channel input at the P Channel frequency. Thus, Doppler shift is measured using information received on the C Channels such that the channel unit normally reserved for measuring Doppler shift via P Channel can be used for voice communications.

A problem may arise when Doppler compensation is performed via C Channel instead of via P Channel. Unless provision is made, the problem can result in violation of the system frequency error budget specified by Inmarsat. Steps 236–248 handle the problem and prevent error budget violations. Before discussing these steps, however, both the problem and its cause are described.

The P Channel input is always radiated by satellite 16, and is continuously available to terminal 100. Thus, when Doppler compensation is performed via P Channel, no problem arises in making Doppler measurements as often as needed to maintain transmissions within the error budget. C Channel inputs, however, are not always available due to the "muting function" of GES 14. GES 14 mutes signals transmitted in the ground-to-air direction during pauses to allow satellite 16, which relays C Channel signals, to conserve electrical power (an expensive resource).

When, for example, a party on the ground making a telephone call to a party on an airplane speaks into a ground-to-air link, the assigned C Channel remains up. When the party on the ground pauses (stops speaking), however, GES 14 recognizes the low voice level on the ground-to-air link and mutes C Channel transmissions up to the airplane to allow satellite 16 to save power. Thus, C Channel signals disappear, and are not always available to AES terminal 100 to measure Doppler shift.

There is, however, a "power control sequence" which occurs every 10 seconds to optimize the power radiated by satellite 16. GES 14 transmits an interrogation message to the aircraft every 10 seconds to instruct the aircraft to increase or decrease the power of its signal by 2 dB, 1 dB and 0 dB. In response to this interrogation, the aircraft sends a signal quality measurement down to GES 14, and GES 14 adjusts its power up or down. Thus, telephone calls typically start at a power level, adjust several times, and then remain at a second power level just high enough to provide acceptable signal quality. This power control sequence takes 5 seconds to complete, and is designed to conserve satellite power. However, this mechanism also assures AES terminal 100 will receive a 5 second C Channel signal on each used line at least every 10 seconds, even if the party on the ground stops speaking.

Referring back to FIG. 7, at steps 232 and 234, AES terminal 100 uses C Channel inputs to measure Doppler shift and to determine Doppler shift for transmissions. However, when AES terminal 100 is not receiving C Channel signals due to the muting function of GES 14, a timer function is implemented to ensure that transmissions from AES terminal 100 do not violate the frequency error budget and start interfering with other Inmarsat calls.

At step 236, a timer T1 is initialized to a value which depends on aircraft dynamics. Timer T1 reflects the maximum elapsed time before transmissions from AES terminal 100 could begin to drift outside the frequency error budget if a new Doppler measurement is not taken. At step 238, a check is made to determine if a valid Doppler measurement was obtained. To measure Doppler shift, a C Channel signal must be present for a period on the order of 100 msec (e.g., 50–100 msec) to allow a channel unit 110 to search for, acquire and lock onto the signal. If a valid Doppler measurement is obtained, T1 is cleared at step 240, and Doppler correction is applied to the channels being transmitted at step 242 (similar to application of Doppler correction signals at step 224).

If, however, a valid Doppler measurement was not obtained, the time since the last valid measurement was obtained is examined at step 244. If timer T1 has not timed out, the previous Doppler compensation values are held, and are applied to the channels being transmitted at step 246.

These values continue to be held until a new valid Doppler measurement is obtained, or T1 times out. When T1 times out, transmissions are at risk of drifting outside the error budget, and a new measurement is needed. To insure that a new Doppler measurement is obtained, a call supported by a channel unit 110 is cleared at step 248, and the released channel unit 110 is used to obtain a new Doppler measurement via P Channel.

Thus, the timer function allows AES terminal 100 to make Doppler measurements using C Channel inputs while those inputs are available, and to hold the Doppler shift compensation values for as long as possible if C Channel measurements become unavailable. When unavailability of the C Channel measurements creates a situation where AES terminal 100 may begin to violate the Inmarsat frequency error budget, AES terminal 100 clears a channel using the "Clear Call" process of FIG. 8, and uses the released channel to perform Doppler compensation via P Channel.

In a particular application, it may be possible to perform statistical calculations to prove that the muting function of GES 14 will not cause all C Channel signals to disappear for long enough to make timer T1 time out. Such calculations would take into account randomization of telephone calls, the number of channel units 110, and the way in which people speak and communicate. In this case, which would be more likely with higher numbers of channel units 110, timer T1 logic may not be needed. In other cases, however, timer T1 insures that AES terminal 100 remains in compliance with Inmarsat frequency error budgets independent of the communications traffic.

Referring to FIG. 8, the "clear call" process is used to release the lowest priority channel unit 110 to make it available for Doppler compensation via P Channel. There are four call priorities in the Inmarsat network. Call priority 9 is for "other non-safety" calls made by general public, which are known as Airline Passenger Communications. Priority 10 is for "other safety" calls made by aircraft personnel, known as Airline Operational Communications (e.g., food service calls). Priority 12 is for "safety" calls made by aircraft crew, known as Air Traffic Communications. Priority 15 is for "distress or urgency" calls made by aircraft personnel in distress or urgent situations (e.g., call to report engine failure).

Passengers are always assigned Call Priority 9. The pilot selects the priority of his call. A queue priority scheme gives higher priority calls precedence over lower priority calls. If, for example, all channels in a six-channel system are being used by passengers and the pilot needs to make a call, a passenger call can be bumped.

At step 250, AES terminal 100 checks if any channel unit 110 is servicing a Priority 9 call and, if so, the Priority 9 call with the shortest duration is cleared or "pre-empted" at step 252. If not, terminal 100 checks at step 254 if any unit 110 is servicing a Priority 10 call and, if so, the Priority 10 call with shortest duration is cleared at step 256. If not, terminal 100 checks at step 258 if any unit 110 is servicing a Priority 12 call and, if so, the Priority 12 call with shortest duration is cleared at step 260. If not, all channel units 110 are servicing Priority 15 calls (step 262), and the call with the shortest duration is cleared at step 264. Thus, the channel unit 110 servicing the lowest priority call with the shortest duration is cleared. At step 266, the released channel unit 110 is configured for receiving P Channel inputs and, at step 268, Doppler compensation via P Channel is performed using the released channel unit.

The party whose call is cleared will find that the system "hangs up" or terminates the telephone call using signalling between AES terminal 100 and GES 14. The call with the shortest duration is cleared at steps 252, 256, 260 and 264 on the assumption that the fewest resources have been invested in that call. For example, given a choice between bumping a passenger who has been talking for 30 minutes or a passenger who has been talking for only 5 minutes, its more efficient to clear the call of the latter passenger since only 5 minutes of call time are potentially wasted rather than 30 minutes.

As stated above, timer T1 is initialized to a value which depends on the "aircraft dynamics". The following describes operation of AES terminal 100 when configured for circuit-mode services only (i.e., Class 2), and also describes the selection of the initial value of timer T1.

Referring to FIG. 9, a worst-case timing diagram 300 for a two-channel AES terminal 100 includes timing traces 302 and 304 indicating presence or non-presence of first and second C Channel inputs at AES terminal 100. These inputs represent two telephone calls being communicated between parties on the ground and parties in the air.

Worst-case timing occurs when neither party on the ground is speaking such that, after a filter time period, GES 14 performs the muting function. Every 10 seconds, a power control sequence occurs on each channel which takes 5 seconds to complete. Thus, even with the party on the ground silent, each C Channel input is present every 10 seconds for a period of 5 seconds each time (signal is alternately present and not present for 5 seconds). The two channels are time-shifted from each other by time d.

Whenever any C Channel input is present for more than 50–100 msec, Doppler compensation via C Channel can be performed. A trace 306 combines traces 302 and 304 (OR function) to indicate the presence of any C Channel input, and shows that at least one C Channel input will be available for more than the 5 second completion time of the power control sequence (i.e., 5+d seconds) every 10 seconds. During this time, Doppler compensation via C Channel is performed and the error budget will be met.

However, when trace 306 shows that no C Channel input is present, the last valid Doppler measurement is held unless timer T1 times out and a call is cleared to perform Doppler compensation via P Channel. Timer T1 is set to the maximum time transmissions will remain within the error budget before a Doppler measurement is needed. This time generally is a function of aircraft dynamics and particularly is a function of aircraft bank angle.

In the above discussion, it was assumed for simplicity that AES terminal 100 was equipped with only two channel units 110. However, this discussion can easily be extended to an n-channel radio (e.g., n=6).

The aircraft bank angle affects the maximum Doppler excursion. Bank angle is a measure of aircraft roll and is typically present during turns. Referring to FIG. 10, worst-case conditions for Doppler shift occur when an aircraft 310 flies a coordinated turn (i.e., steady level turn) represented by a circle 312. Circle 312 defines a plane intersecting a stationary satellite 314. Maximum Doppler shift occurs at points tangent to a line drawn from satellite 314 to circle 312 since aircraft 310 is flying directly toward or away from satellite 314. No Doppler shift occurs at points midway between the tangent points since aircraft 310 is not flying toward or away from satellite 314. Timer T1 is initialized to a value representing the maximum time a previous measured Doppler shift can be held before the actual shift has changed so much that an updated Doppler shift measurement is needed. Thus, the value of timer T1 depends upon the maximum rate of change in Doppler shift as aircraft 310 flies around circle 312 which, in turn, is a function of bank angle.

When aircraft 310 flies a coordinated turn, the Doppler shift with respect to stationary satellite 314 obeys the following relationship:

$$F_d = F_d^{max} * \cos(\Theta) = (V/\lambda) * \cos(\Theta) \tag{2}$$

wherein $F_d$ is Doppler frequency (Hz), $F_d^{max}$ is maximum Doppler frequency (Hz), $\Theta$ is angle between the line drawn from satellite 314 to the body axis of aircraft 310, $\lambda$ is wavelength of transmitted signal from satellite 314 to aircraft 310 (m), and V is aircraft ground speed (m/sec).

Referring to FIG. 11, Doppler characteristics under the scenario of FIG. 10 are shown for various values of aircraft ground speed V during one complete turn around the flight path represented by circle 312. Curves 316–328 represent ground speeds V of 200, 300, 400, 500, 600, 700 and 800 knots, respectively. It is assumed that the transmitted frequency is in L-band region (e.g., 1.6605 GHz), and the initial position on the flight path is at angle $\Theta=0$. FIG. 11 shows Doppler shift to have maximum values at angles $\Theta$ of 0, 180 and 360 degrees, and minimum values (i.e., 0) at angles $\Theta$ of 90 and 270 degrees.

Referring to FIG. 12, in such a turn, aircraft body axis roll rate $P_1$, body axis pitch rate $Q_1$, and body axis yaw (heading) rate $R_1$ are given, respectively, by:

$$P_1 = 0 \tag{3}$$

$$Q_1 = \Psi_1 * \sin(\Phi_1) \tag{4}$$

$$R_1 = \Psi_1 * \cos(\Phi_1) \tag{5}$$

wherein $\Psi_1$ is the aircraft's rate-of-turn, and $\Phi_1$ is the steady-state bank (i.e., roll) angle. To maintain equilibrium, the following relationships must hold:

$$C.F. = m * R_1 * \Psi_1^2 = L_1 * \sin(\Phi_1) \tag{6}$$

$$W = L_1 * \cos(\Phi_1) = m * g \tag{7}$$

wherein C.F. is centripetal force, $L_1$ is Lift, $R_1$ is the turn radius, m is aircraft mass, $\Phi_1$ is the bank angle, W is aircraft weight, and g is the acceleration of gravity.

The kinematics relationship for aircraft speed along the flight body axis $U_1$ is given by:

$$U_1 = R_1 * \Psi_1 \tag{8}$$

From equations (6), (7) and (8), aircraft radius of turn and rate-of-turn are derived as:

$$R_1 = U_1^2 / (g * \tan(\Phi_1)) \tag{9}$$

$$\Psi_1 = g * \tan(\Phi_1) / U_1 \tag{10}$$

Equation (10) indicates that aircraft 310 completes one revolution around the flight path in a time t given by:

$$t = 360 / \Psi_1 = 360 * U_1 / (g * \tan(\Phi_1)) \tag{11}$$

FIG. 11 shows that peak Doppler shift is reached twice in one complete revolution of aircraft 310 around its flight path and time duration t. It also shows that, from an initial Doppler value of 0, peak Doppler shift is reached in an interval of time equal to ¼ of time duration t.

The load factor n, a measure of total acceleration (G's) experienced by a aircraft passenger, is defined as:

$$n = 1 / \cos(\Phi_1) \tag{12}$$

Referring to FIG. 13, the aircraft turn rate is plotted against the bank angle as a function of ground speed V.

Curves 330–342 represent ground speeds V of 200, 300, 400, 500, 600, 700 and 800 knots, respectively.

Referring to FIG. 14, the elapsed time (from zero Doppler) to reach the peak Doppler values of FIG. 11 is plotted against bank angle at various values of aircraft ground speed V. Curves 344–356 represent speeds V of 200, 300, 400, 500, 600, 700 and 800 knots, respectively.

Given a specified maximum frequency error, with Doppler shift, elapsed time to reach this error may be obtained from FIGS. 11 and 14 for specific bank angles.

Referring to FIG. 15B, maximum Doppler shift is plotted against angle Θ as a function of aircraft ground velocity V. Curves 358–368 represent aircraft ground speeds V of 400, 500, 600, 700, 800 and 900 knots, respectively. FIG. 15A shows the elapsed time to reach peak Doppler values in FIG. 15B.

Referring to FIG. 16, the elapsed time before reaching a system frequency error budget for L-to-C link from an initial value of 0 is plotted against the bank angle for different frequency error budgets. Curves 370 and 372 represent error budgets of 185 Hz and 100 Hz, respectively. The elapsed time values shown in FIG. 16 are independent of aircraft ground velocity V.

Referring to FIG. 17, the elapsed time to reach the system frequency error budgets for the L-to-C link from an initial value of zero is tabulated. The first through fourth columns indicate the bank angle in degrees, load factor n in G's, the elapsed time for an error budget of 185 Hz, and the elapsed time for an error budget of 100 Hz, respectively. For a bank angle of 30 degrees and a frequency error budget of 100 Hz, for example, timer T1 should be initialed to 5.0 seconds. For a shallower bank angle such as 5 degrees, timer T1 should be initialized to 33 seconds. Timer T1 is preferably initialized as a function of bank angle as shown in FIG. 17.

Thus, as described above, measured Doppler shift is held for a maximum time which depends upon the aircraft bank angle (e.g., 5.0 sec for bank angle of 30 degrees). In another embodiment, AES terminal 100 tracks the rate of change in the Doppler compensation. Then, when no C Channel signals are received, AES terminal 100 maintains the same rate of change of Doppler compensation that was occurring before the signal was lost. Assuming that, for example, at the time all C Channel inputs disappeared, the Doppler shift of 100 Hz was changing at the rate of +3 Hz/sec, Doppler compensation of 103 Hz is applied 1 second later, 106 Hz is applied two seconds later, etc. Thus, Doppler compensation is set equal to the held value+(rate of change*time since signal lost).

In another embodiment, timer T1 is initialized to a constant value. For example, a 5 sec value allows for a bank angle of 30 degrees. In this embodiment, timer T1 is initialized to a value based upon the worst-case bank angle. Setting T1 based on bank angle allows timer T1 to be extended during other than worst-case conditions.

The embodiments illustrated in the FIGs. and described above are presently preferred. However, it should be understood that these embodiments are offered by way of example only. The invention is not limited to a particular embodiment, but extends to modifications that fall within the scope of the appended claims.

What is claimed is:

1. An Aircraft Earth Station (AES) terminal for satellite communications capable of use in circuit-mode services only applications, the terminal comprising:

a plurality of channel units, each channel unit configured to receive a circuit channel input having a known transmitted frequency and to transmit a circuit channel output at an adjustable transmit frequency, wherein each channel unit can measure the frequency of its received circuit channel input and can adjust the frequency of its transmitted circuit channel output; and a processing circuit coupled to the plurality of channel units, the processing circuit configured to measure Doppler shift based upon a difference between the measured frequency and the known transmitted frequency of at least one of the circuit channel inputs, to determine a Doppler correction for each transmitted circuit channel output based on the measured Doppler shift, and to apply the Doppler correction to adjust the frequency of each transmitted circuit channel output to correct for Doppler shift.

2. The terminal of claim 1, wherein each channel unit receives its circuit channel input by searching for, acquiring, and locking onto its circuit channel input.

3. The terminal of claim 2, wherein the processing circuit measures Doppler shift of more than one circuit channel input, and processes the Doppler measurements to generate a single measured Doppler shift which is used to determine the Doppler correction for each transmission.

4. The terminal of claim 3, wherein the Doppler measurements are processed by dropping the highest and lowest measurements and averaging the other measurements.

5. The terminal of claim 1, wherein the Doppler correction for each transmitted circuit channel output is based upon the ratio of the received circuit channel frequency to each transmitted circuit channel frequency.

6. The terminal of claim 5, wherein the Doppler correction is applied to adjust the frequency of each circuit channel output in the opposite direction from the Doppler shift of the received circuit channel input.

7. The terminal of claim 1, wherein the measured Doppler shift is used to determine the Doppler correction for each transmission for only a limited time period.

8. The terminal of claim 7, wherein, after the limited time period expires without a new valid Doppler measurement, one of the channel units is reconfigured to operate as a data channel to receive a P Channel input and to measure Doppler shift via the P Channel input.

9. A SATCOM terminal for providing communications services between an aircraft and a satellite, the SATCOM terminal having a plurality of selectable configuration options, one of the configuration options adapted for providing circuit-mode services only and at least one of the other configuration options adapted for providing at least some data packet services, the terminal comprising:

a plurality of channel units for communicating signals via channels between the aircraft and satellite, each channel unit operable as a data or circuit channel, each channel unit configured to receive a channel input having a known transmitted frequency and to transmit a channel output at an adjustable transmit frequency, wherein each channel unit can measure the frequency of its received channel input and can adjust the frequency of its transmitted channel output; and a processing circuit coupled to the plurality of channel units, the processing circuit configured, when circuit-mode services only is selected, to operate each of the plurality of channel units as a circuit channel, to measure Doppler shift based upon a difference between the measured frequency and known transmitted frequency of at least one of the channel inputs, to determine a Doppler correction for each transmitted channel output based on the measured Doppler shift, and to apply the Doppler correction to adjust the frequency of each transmitted channel output to correct for Doppler shift.

10. The terminal of claim 9, wherein the channel units communicate telephone calls via C Channels when operating as circuit channels.

11. The terminal of claim 10, wherein the channel units communicate P, R and T Channels when operating as data channels.

12. The terminal of claim 10, wherein the channel units receive telephone calls via C Channels by searching for, acquiring, and locking onto C Channel inputs.

13. The terminal of claim 10, wherein Doppler shift is measured for more than one C Channel input, and the measurements are processed to generate a single measured Doppler shift used to determine each Doppler correction.

14. The terminal of claim 13, wherein the Doppler correction for each transmitted channel output is based upon the ratio of the received channel input frequency to each transmitted channel output frequency.

15. The terminal of claim 14, wherein the Doppler correction is applied to adjust the frequency of each channel output in the opposite direction from the Doppler shift of the received channel input.

16. The terminal of claim 9, wherein the measured Doppler shift is used to determine the Doppler correction for each transmission for only a limited time period.

17. The terminal of claim 16, wherein the limited time period is set as a function of aircraft dynamics.

18. The terminal of claim 17, wherein the limited time period is set as a function of aircraft bank angle.

19. The terminal of claim 16, wherein, after the limited time period expires without a new valid Doppler measurement, one of the channel units is reconfigured to operate as a data channel to receive a P Channel input and to measure Doppler shift via the P Channel input.

20. A method for Doppler shift compensation in a satellite communications terminal for an aircraft during circuit-mode services only communications, the terminal including a plurality of channel units wherein each channel unit provides a circuit channel for supporting a telephone call, the method comprising:

receiving at least one circuit channel input, the at least one circuit channel input having been transmitted by a communications satellite at a known frequency, each circuit channel input having a frequency dependent upon the known transmit frequency and the relative velocity between the aircraft and satellite;

measuring the frequency of the at least one received circuit channel input;

calculating a Doppler error value for the at least one received circuit channel input as a difference between the measured frequency and the known transmit frequency of the at least one received circuit channel input;

determining a Doppler correction value for each circuit channel transmission based upon the Doppler error value; and applying the Doppler correction value to each transmission of the satellite communications terminal, thereby correcting each transmission for Doppler shift.

* * * * *